US012782237B2

(12) United States Patent
Kobayashi

(10) Patent No.: US 12,782,237 B2
(45) Date of Patent: Nov. 3, 2026

(54) TIRE BEHAVIOR ESTIMATING DEVICE, TIRE BEHAVIOR ESTIMATING METHOD, AND PROGRAM

(71) Applicant: BRIDGESTONE CORPORATION, Tokyo (JP)

(72) Inventor: Takao Kobayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 384 days.

(21) Appl. No.: 18/569,227

(22) PCT Filed: Jul. 11, 2022

(86) PCT No.: PCT/JP2022/027319
§ 371 (c)(1),
(2) Date: Dec. 12, 2023

(87) PCT Pub. No.: WO2023/286750
PCT Pub. Date: Jan. 19, 2023

(65) Prior Publication Data

US 2024/0295469 A1 Sep. 5, 2024

(30) Foreign Application Priority Data

Jul. 12, 2021 (JP) ................................ 2021-115174
Oct. 26, 2021 (JP) ................................ 2021-174828

(51) Int. Cl.
*G01M 17/02* (2006.01)

(52) U.S. Cl.
CPC .................................. *G01M 17/02* (2013.01)

(58) Field of Classification Search
None
See application file for complete search history.

(56) References Cited

U.S. PATENT DOCUMENTS

2005/0197994 A1 9/2005 Fujii et al.
2007/0233352 A1 * 10/2007 Miyashita ............ B60W 40/12 701/82

(Continued)

FOREIGN PATENT DOCUMENTS

DE 102015005019 A1 10/2016
JP 2006-259975 A 9/2006

(Continued)

OTHER PUBLICATIONS

Akira Higuchi, "Tire Model for Vehicle Dynamic Analysis", Transactions of Society of Automotive Engineers of Japan, vol. 45, No. 1 (2014): p. 101-107. (Year: 2014).*

(Continued)

*Primary Examiner* — Eric S. McCall
*Assistant Examiner* — Nigel H Plumb
(74) *Attorney, Agent, or Firm* — SOLARIS Intellectual Property Group, PLLC

(57) ABSTRACT

A tire behavior estimating device that estimates a physical amount relating to behavior of a tire from tire design information by using a tire model that outputs a physical amount relating to behavior of a tire in accordance with input parameters, the device including: a storing section storing relationships of correspondence between tire design information and parameters that are inputs to the tire model; an acquiring section acquiring tire design information; a converting section that, based on the relationships of correspondence stored in the storing section, converts tire design information acquired at the acquiring section into parameters to be input into the tire model; and an inputting section inputting the parameters converted at the converting section into the tire model.

3 Claims, 8 Drawing Sheets

(56) References Cited

U.S. PATENT DOCUMENTS

| | | | | |
|---|---|---|---|---|
| 2008/0059134 | A1* | 3/2008 | Miyashita | B60C 99/006 703/8 |
| 2008/0243446 | A1 | 10/2008 | Miyashita et al. | |
| 2016/0159365 | A1 | 6/2016 | Singh | |

FOREIGN PATENT DOCUMENTS

| | | | |
|---|---|---|---|
| JP | 2007-290694 | A | 11/2007 |
| JP | 2008-049724 | A | 3/2008 |
| JP | 2008-049725 | A | 3/2008 |
| JP | 2011-116151 | A | 6/2011 |
| JP | 2014-228316 | A | 12/2014 |
| JP | 2018-096894 | A | 6/2018 |

OTHER PUBLICATIONS

Naoshi Miyashita, “A Study of Transient Cornering Property by Use of an Analytical Tire Model”, non-official translation (Proceedings of the Autonomous Vehicle Technology Association.), Internet : (Year: 2013).*

Pacejka, Hans, “Tyre and Vehicle Dynamics”, Delft University of Technology, XP093127051, Retrieved from the Internet: URL:https://books.google.de/books/about/Tyre_and_Vehicle_Dynamics.html?id=wHlkbBnu9FEC&redir_esc=y [retrieved on Feb. 2, 2024] , Elsevier, Jan. 1, 2006.

Palkovics L. et al., “Neural network representation of tyre characteristics: the neuro-tyre”, International Journal of Vehicle Design, St Helier, GB, vol. 14, No. 5-6, Jan. 1, 1993, pp. 563-591.

Akira Higuchi, “Tire Model for Vehicle Dynamic Analysis”, Transactions of Society of Automotive Engineers of Japan, vol. 45, No. 1 (2014): p. 101-107.

Naoshi Miyashita, “A Study of Transient Cornering Property by Use of an Analytical Tire Model”, non-official translation (Proceedings of the Autonomous Vehicle Technology Association.), Internet : <URL:https://www.jstage.jst.go.jp/article/jsaeronbun/44/6/44_20134849/_pdf/-char/ja>, DOI: https://doi.org/10.11351/jsaeronbun.44.1391, Nov. 2013, vol. 44, No. 6, pp. 1391-1396.

“MF-Tyre/MF-Swift 6.2 Equation manual” TNO, Netherlands, 2013.

International Search Report issued in International Application No. PCT/JP2022/027319 on Sep. 13, 2022.

Ifqir, Sara et al., “An Interval Algebraic Approach for vehicle lateral tire forces estimation”, 2019 IEEE Intelligent Transportation Systems Conference (ITSC), IEEE, Oct. 27, 2019 (Oct. 27, 2019), pp. 3601-3606, XP033668472, [retrieved on Nov. 27, 2019].

Braghin, F. et al., “Identification of tire model parameters through full vehicle experimental tests”, Journal of Dynamic Systems, Measurement, and Control, vol. 133, No. 3, Jan. 1, 2011 (Jan. 1, 2011), p. 031006-1 to 031006-11, XP009158640.

Pacejka, Hans B., “Tyre and Vehicle Dynamics” Elsevier B.V., 2012. (Cited as: Referex, Jan. 1, 2012, XP040425353).

Extended European Search Report dated Aug. 1, 2025, issued in corresponding EP Patent Application No. 25172276.5.

Search Report of the Chinese office action dated May 23, 2026, from the SIPO in a Chinese patent application No. 202280043488.9 corresponding to the instant patent application.

* cited by examiner

TIRE BEHAVIOR ESTIMATING DEVICE, TIRE BEHAVIOR ESTIMATING METHOD, AND PROGRAM

TECHNICAL FIELD

The present disclosure relates to a tire behavior estimating device, a tire behavior estimating method and a program.

BACKGROUND ART

Simulations of vehicle traveling that model the traveling of a vehicle by various numerical analyses using computers have conventionally been carried out with respect to vehicles that are equipped with tires. In a vehicle traveling simulation, in a vehicle model that is determined from vehicle specifications, the behavior of the vehicle model with respect to various forces in accordance with the traveling state that models traveling of a vehicle, is analyzed. In particular, in a vehicle, tires that transmit to the vehicle body forces that are received from the road surface are important elements. A tire model that models tire behavior is important in executing vehicle traveling simulations with high precision. A tire model called the Magic Formula, which is expressed by the linear sum of plural numerical formulas and plural coefficients that express various types of forces generated at the tire, is known as a tire model. Techniques are known that model the behavior of tire by using this Magic Formula as a tire model and inputting coefficients that are derived by using data obtained from the actual measurement of tires (see, for example, Japanese Patent Application Laid-Open (JP-A) No. 2006-259975, JP-A No. 2008-049724).

Further, there is known a technique of carrying out vehicle motion analysis by setting a tire model by particular numerical formulas that use tire design information, with respect to various forces that are generated at tires (see, for example, Higuchi, Akira. "Tire Model for Vehicle Dynamic Analysis", *Transactions of Society of Automotive Engineers of Japan*, Vol. 45, No. 1 (2014): p. 101-107).

SUMMARY OF INVENTION

A tire behavior estimating device of the present disclosure is a tire behavior estimating device that estimates a physical amount relating to behavior of a tire from tire design information by using a tire model that outputs a physical amount relating to behavior of a tire in accordance with input parameters, the device comprising: a storing section storing relationships of correspondence between tire design information and parameters that are inputs to the tire model; an acquiring section acquiring tire design information; a converting section that, based on the relationships of correspondence stored in the storing section, converts tire design information acquired at the acquiring section into parameters to be input into the tire model; and an inputting section inputting the parameters converted at the converting section into the tire model.

A tire behavior estimating method of the present disclosure is a tire behavior estimating method that estimates a physical amount relating to behavior of a tire from tire design information by using a tire model that outputs a physical amount relating to behavior of a tire in accordance with input parameters, the method comprising: acquiring tire design information; converting acquired tire design information into parameters to be input into the tire model, based on relationships of correspondence stored in a storing section that stores relationships of correspondence between tire design information and parameters that are inputs to the tire model; and inputting the converted parameters into the tire model.

A program of the present disclosure is a program for a computer to estimate a physical amount relating to behavior of a tire from tire design information by using a tire model that outputs a physical amount relating to behavior of a tire in accordance with input parameters, the program causing the computer to execute processing including: acquiring tire design information; converting acquired tire design information into parameters to be input into the tire model, based on relationships of correspondence stored in a storing section that stores relationships of correspondence between tire design information and parameters that are inputs to the tire model; and inputting the converted parameters into the tire model.

Note that the storage medium that stores the program of the present disclosure is not particularly limited, and may be a hard disk or may be a ROM. Further, the storage medium may be a storage medium such as a CD-ROM, a DVD disc, a magneto optical disc, an IC card or the like. Moreover, the program may be downloaded from a server that is connected to a network, or the like.

DESCRIPTION OF EMBODIMENTS

Figure 1:
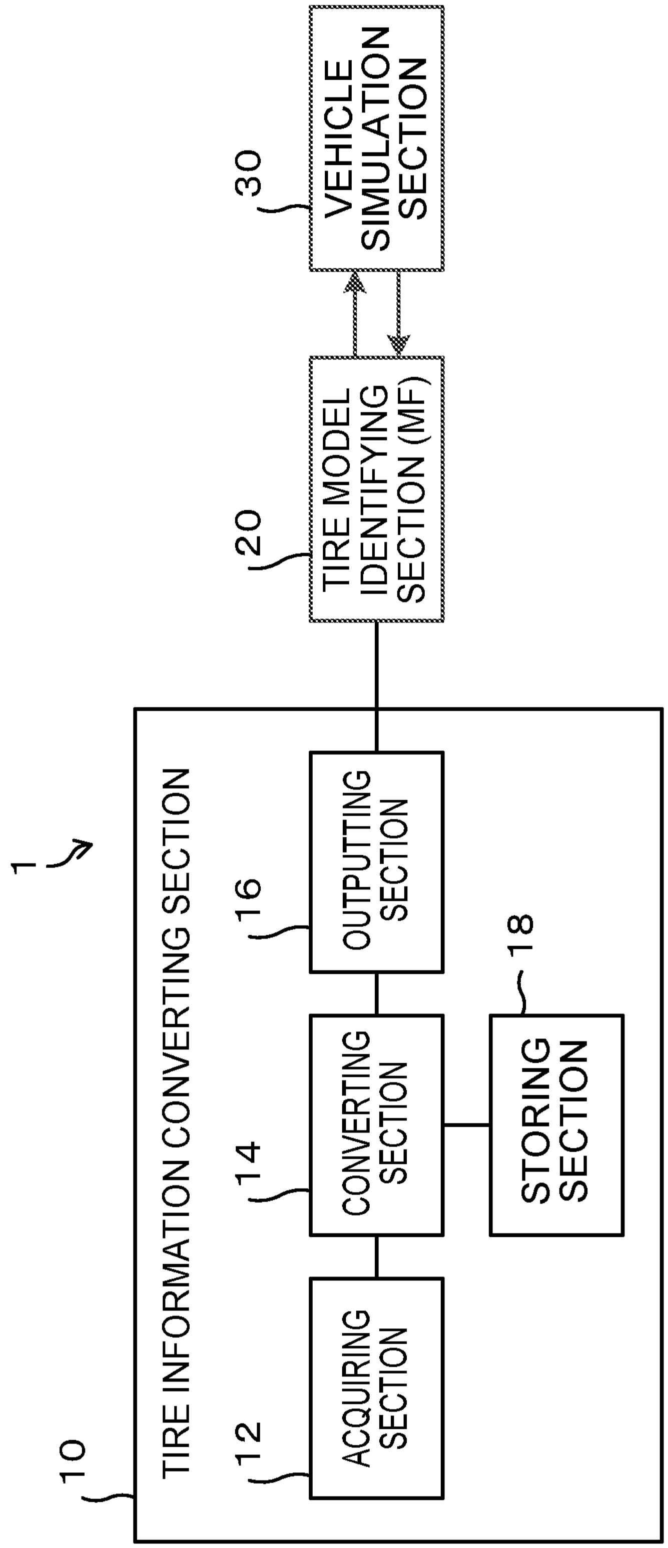
FIG. 1 is a schematic structural drawing illustrating an example of an analyzing device relating to a first embodiment.

Embodiments that realize the technique of the present disclosure are described in detail hereinafter with reference to the drawings. Note that structural elements and processings whose operations and functions have the same workings are denoted by the same reference numerals throughout all of the drawings, and repeat described may be omitted as appropriate.

By the way, when using the Magic Formula as a tire model, the direct relation between the parameters, which are for determining the coefficients used in the Magic Formula, and tire design information such as cornering stiffness and the like is weak, and it is difficult to explicitly reflect the tire design information in the tire model. On the other hand, when using particular numerical formulas, which utilize tire design information, as a tire model, the tire model must be determined by using the particular numerical formulas, and it is difficult to use a generic tire model such as the Magic Formula or the like for example, and the convenience also deteriorates. Accordingly, there is room for improvement in analyzing the behavior of tires in detail while taking the tire design information into consideration and without using data obtained by the actual measurement of tires.

In view of the above-described circumstances, the present disclosure easily carries out behavior analysis of a tire by using tire design information and without using data obtained by the actual measurement of tires.

Further, in accordance with the present disclosure, behavior analysis of a tire can be carried out easily by using tire design information and without using data obtained by the actual measurement of tires.

First Embodiment

FIG. 1 illustrates the structure of an analyzing device 1 that analyzes the behavior of a vehicle, as an example of a system that includes the tire behavior estimating device of the present disclosure. The analyzing device 1 carries out a simulation (e.g., vehicle motion analysis) relating to the traveling of a vehicle, by a vehicle model that has a tire model determined by using tire design information.

At a tire, a material, whose phase does not change due to the application of energy at less than or equal to ordinary temperatures or the like for example, is formed continuously, and the tire includes at least an elastic body. At the elastic body, it suffices for a material that is elastic to be formed continuously, and the elastic body may be any of, for example, a rubber material, a polyurethane material, a polymer material or the like. A case in which a rubber material is used as the tire is described hereinafter, but the tire is not limited to a rubber material. The technique of the present disclosure can, of course, be applied to cases in which another elastic body such as, for example, a polyurethane material, a polymer material or the like is used.

(Cornering Stiffness)

Tire design information is a concept that includes data of tire specifications, and data expressing characteristics relating to the generated forces of the tire. Examples of data of tire specifications are data expressing the structure, the shape and the materials of the tire. Examples of data expressing characteristics relating to the generated forces of the tire are data expressing tire characteristics such as cornering stiffness, the road friction coefficient, self-aligning torque, and the like.

The tire model is a model that models the behaviors and states of a tire, and is a concept that includes models that are for deriving various tire behaviors and states by using numerical analysis methods. In the present disclosure, a tire model, which outputs a physical amount relating to the behavior of the tire in accordance with input parameters, is used as the tire model. For example, a model, which expresses a tire by a function to which parameters relating to a tire are input and which outputs a generated force or moment (e.g., lateral force) of the tire, is used (details described later).

A vehicle model is a model that, based on vehicle specifications and the traveling state, models behaviors and states of a vehicle, and is a model that is for determining various behaviors and states of a vehicle by using numerical analysis methods. Because vehicle models are known techniques, detailed description thereof is omitted here.

As illustrated in FIG. 1, the analyzing device 1 has a tire information converting section 10, a tire model identifying section 20, and a vehicle simulation section 30.

By inputting parameters, which relate to tire design information, to a tire model, the analyzing device 1 identifies a tire model in which the tire design information is reflected, and carries out vehicle simulation by a vehicle model by using the identified tire model. Specifically, at the tire information converting section 10, the analyzing device 1 converts the tire design information into parameters of a tire model. At the tire model identifying section 20, the analyzing device 1 determines a tire model, in which the tire design information is reflected, by identifying the tire model by using the converted parameters. At the vehicle simulation section 30, the analyzing device 1 carries out vehicle simulation by using the tire model.

The tire information converting section 10 is a functional section that converts tire design information into parameters that that are to be input to a tire model. The tire information converting section 10 is described in detail later. The vehicle simulation section 30 is a functional section that carries out vehicle simulation by using a tire model in which tire design information is reflected. Note that, because the processings executed at the vehicle simulation section 30 are known techniques, detailed description thereof is omitted.

The tire model identifying section 20 is a functional section that, by identifying a tire model by using the parameters converted at the tire information converting section 10, determines a tire model in which the tire design information is reflected. At the tire model identifying section 20, a generated force of the tire is derived by using the tire model in which the tire design information is reflected. In the present embodiment, a model called the Magic Formula (hereinafter called "MF") is used as an example of the tire model.

An example of the MF model that is used as the tire model is expressed by following formula (1).

[Numerical Formula 1]

$$F_{yp} = D_y \sin\left[C_y \arctan\left\{B_y\alpha_y - E_y\left(B_y\alpha_y - \arctan(B_y\alpha_y)\right)\right\}\right] + S_{Vy} \quad (1)$$

Formula (1) is an example of modeling lateral force $F_{yp}$ that is a force generated by the tire at the time of pure lateral slip, and is an example of a physical characteristic in a simple slip state (pure slip). $\alpha_y$ in the formula is the input such as the slip angle or the slip ratio or the like, By is the stiffness factor, $C_y$ is a shape factor expressing lateral stiffness, $D_y$ is a peak value, $E_y$ is the curve factor, and $S_{Vy}$ is a coefficient called vertical shift. These constants and coefficients are called MF coefficients hereinafter.

The lateral force $F_{yp}$ can be modeled by identifying the MF coefficients of above formula (1). In the MF model, the simulation accuracy of the tire model is improved by using parameters relating to the tire such as $p_{Dy1}$, $p_{Dy2}$, $p_{Ky1}$, $p_{Ky2}$ and the like, and (a parameter expressing) load change amount dfz, instead of using the MF coefficients as eigenvalues of the tire. $p_{Dy1}$, $p_{Dy2}$ are parameters expressing lateral friction coefficients, and $p_{Ky1}$, $p_{Ky2}$ are parameters expressing tire stiffness factors. Accordingly, in the MF model, by inputting parameters such as these $p_{Dy1}$, $p_{Dy2}$, $p_{Ky1}$, $p_{Ky2}$ and the like (hereinafter called MF parameters), the lateral force $F_{yp}$ generated at the tire can be derived with high accuracy.

Note that, when considering the lateral force $F_{yp}$ as the physical amount relating to tire behavior, it suffices to identify $p_{Dy1}$, $p_{Dy2}$, $p_{Ky1}$, $p_{Ky2}$ as the MF parameters, and constants expressing standard values can be set as the other parameters.

The MF parameters are parameters that are determined by the derivation or the like of predetermined characteristics expressed by actually measured values and the like of tires, and it is thought that the tire design information is implicitly reflected in the tire model. Namely, it is difficult for the MF parameters to cause the tire design information to be explicitly reflected in the tire model (i.e., the MF model). In the present embodiment, by converting the tire design information into MF parameters at the tire information converting section 10, the tire design information can be explicitly reflected in the MF model.

The tire information converting section 10 is described in detail next. The tire information converting section 10 has an acquiring section 12, a converting section 14, an outputting section 16 and a storing section 18. Information, which expresses relationships of correspondence between the tire design information and the MF parameters, is stored in the storing section 18 as tables of correspondence. Numerical formulas are stored in the tables of correspondence, and values may be computed by using these stored numerical formulas. The acquiring section 12 is a functional section that acquires data expressing the tire design information. The converting section 14 is a functional section that, based on the tables of correspondence stored in the storing section 18, converts the data, which was acquired by the acquiring section 12 and expresses the tire design information, into data expressing MF parameters. The outputting section 16 is a functional section that outputs the data, which has been converted at the converting section 14 and expresses the MF parameters, to the tire model identifying section 20 for input into the tire model.

The tire information converting section 10 is an example of the tire behavior estimating device of the present disclosure. The acquiring section 12 is an example of the acquiring section of the present disclosure. The converting section 14 is an example of the converting section of the present disclosure. The outputting section 16 is an example of the inputting section of the present disclosure. The storing section 18 is an example of the storing section of the present disclosure.

The relationships of correspondence between the tire design information and the MF parameters, which relationships are stored in the storing section 18 as tables of correspondence, are described next. Here, explanation is given of a case in which cornering stiffness is used as an example of the tire design information. Further, normalized cornering stiffness at a prescribed load that is determined in advance is used in the present embodiment.

Aforementioned shape factor $C_y$ corresponds to the normalized cornering stiffness (an example of the tire design information), and the normalized cornering stiffness can be expressed by following formula (2).

[Numerical Formula 2]

$$c_y = \frac{\partial F_{yp}}{\partial \alpha_F}\frac{1}{F_z} = \frac{K_{y\alpha}}{F_z} \tag{2}$$

$F_z$ in the formula represents load, and $K_{y\alpha}$ is tire design information that is called the cornering stiffness.

Here, the normalized cornering stiffness can be expressed by following formula (3), under the conditions that the camber angle $\gamma$ is zero ($\gamma=0$), there is a prescribed internal pressure (pressure increment dpi=0), and there is no turn slip (the MF internal variable $\zeta_3=1$), from the standpoint of the time of a pure lateral slip. Further, the load dependence of the normalized cornering stiffness can be expressed by following formula (4).

[Numerical Formula 3]

$$c_y = \frac{K_{y\alpha}}{F_z} = p_{Ky1}\cdot\frac{F'_{z0}}{F_z}\cdot\sin\left[p_{Ky4}\arctan\left\{\frac{F_z}{p_{Ky2}F'_{z0}}\right\}\right] \tag{3}$$

[Numerical Formula 4]

$$\frac{\partial c_y}{\partial F_z} = -p_{Ky1}\cdot\frac{F'_{z0}}{F_z^2}\cdot\sin\left[p_{Ky4}\arctan\left\{\frac{F_z}{p_{Ky2}F'_{z0}}\right\}\right] + p_{Ky1}\cdot\frac{F'_{z0}}{F_z}\cdot\cos\left[p_{Ky4}\arctan\left\{\frac{F_z}{p_{Ky2}F'_{z0}}\right\}\right]\frac{p_{Ky4}}{p_{Ky2}F'_{z0}}\frac{1}{1+\left(\frac{F_z}{p_{Ky2}F'_{z0}}\right)^2} \tag{4}$$

$F'_{z0}$ in the formulas represents the prescribed load, and $p_{ky4}$ is an MF parameter.

Here, given that load $F_z$ is the prescribed load $F'_{z0}$ ($F_z=F'_{z0}$), the normalized cornering stiffness can be expressed by following formula (5), and the load dependence of the normalized cornering stiffness can be expressed by following formula (6).

[Numerical Formula 5]

$$c_y = p_{Ky1}\cdot\sin\left[p_{Ky4}\arctan\left\{\frac{1}{p_{Ky2}}\right\}\right] \tag{5}$$

[Numerical Formula 6]

$$\frac{\partial c_y}{\partial F_z} = -\frac{p_{Ky1}}{F'_{z0}}\cdot\sin\left[p_{Ky4}\arctan\left\{\frac{1}{p_{Ky2}}\right\}\right] + p_{Ky1}\cdot\cos\left[p_{Ky4}\arctan\left\{\frac{1}{p_{Ky2}}\right\}\right]\frac{p_{Ky4}}{p_{Ky2}F'_{z0}}\frac{1}{1+\left(\frac{1}{p_{Ky2}}\right)^2} \tag{6}$$

Here, when considering constraint conditions (e.g., MF parameter $p_{ky4}=2$) at the time of standard identification that is used in versions before a predetermined version of the MF (MF-Tyre 5.2), the normalized cornering stiffness can be expressed by following formula (7), and the load dependence of the normalized cornering stiffness can be expressed by following formula (8).

[Numerical Formula 7]

$$c_y = p_{Ky1}\cdot\sin\left[2\,\mathrm{arc\,tan}\left\{\frac{1}{p_{Ky2}}\right\}\right] \tag{7}$$

[Numerical Formula 8]

$$\frac{\partial c_y}{\partial F_z} = -\frac{p_{Ky1}}{F'_{z0}}\cdot\sin\left[2\,\mathrm{arc\,tan}\left\{\frac{1}{p_{Ky2}}\right\}\right] + p_{Ky1}\cdot\cos\left[2\,\mathrm{arc\,tan}\left\{\frac{1}{p_{Ky2}}\right\}\right]\frac{2}{p_{Ky2}F'_{z0}}\frac{1}{1+\left(\frac{1}{p_{Ky2}}\right)^2} \tag{8}$$

Next, given that the variables expressing the normalized cornering stiffness and the load dependence thereof are respectively Wa, Wb, a double angle formula of the tangent function can be applied by using a constraint condition (e.g., $p_{ky4}=2$). The load dependence Wb of the normalized cornering stiffness that is expressed by the normalized cornering stiffness Wa is expressed by following formula (9). Arranging formula (9) results in expression by formula (10).

[Numerical Formula 9]

$$\begin{aligned} Wb &= -\frac{Wa}{F'_{z0}} + \frac{2Wa}{p_{Ky2}F'_{z0}\tan\left[2\,\mathrm{arctan}\left\{\frac{1}{p_{Ky2}}\right\}\right]}\frac{1}{1+\left(\frac{1}{p_{Ky2}}\right)^2} \\ &= -\frac{Wa}{F'_{z0}} + \frac{2Wa}{p_{Ky2}F'_{z0}\dfrac{2\tan\left[2\,\mathrm{arctan}\left\{\frac{1}{p_{Ky2}}\right\}\right]}{1-\tan^2\left[\mathrm{arctan}\left\{\frac{1}{p_{Ky2}}\right\}\right]}}\frac{1}{1+\left(\frac{1}{p_{Ky2}}\right)^2} \\ &= -\frac{Wa}{F'_{z0}} + \frac{Wa}{p_{Ky2}F'_{z0}\dfrac{\left(\frac{1}{p_{Ky2}}\right)}{1-\left(\frac{1}{p_{Ky2}}\right)^2}}\frac{1}{1+\left(\frac{1}{p_{Ky2}}\right)^2} \\ &= -\frac{Wa}{F'_{z0}} + \frac{Wa\left[1-\left(\frac{1}{p_{Ky2}}\right)^2\right]}{F'_{z0}}\frac{1}{1+\left(\frac{1}{p_{Ky2}}\right)^2} \end{aligned} \tag{9}$$

[Numerical Formula 10]

$$\begin{aligned} WbF'_{z0}\left[1+\left(\frac{1}{p_{Ky2}}\right)^2\right] &= -Wa\left[1+\left(\frac{1}{p_{Ky2}}\right)^2\right] + Wa\left[1-\left(\frac{1}{p_{Ky2}}\right)^2\right] \\ WbF'_{z0}\left(p_{Ky2}^2+1\right) &= -Wa\left(p_{Ky2}^2+1\right) + Wa\left(p_{Ky2}^2-1\right) \\ &= -2Wa \end{aligned} \tag{10}$$

From above formula (10), the MF parameters $p_{Ky1}$, $p_{Ky2}$ can be expressed by following formula (11) and formula (12).

[Numerical Formula 11]

$$p_{Ky2} = \sqrt{-\frac{2Wa}{WbF'_{z0}} - 1} \tag{11}$$

[Numerical Formula 12]

$$p_{Ky1} = \frac{Wa}{\sin\left[2\,\mathrm{arctan}\left\{\frac{1}{p_{Ky2}}\right\}\right]} \tag{12}$$

Accordingly, it suffices to store, in the storing section 18, the relationships of correspondence between the tire design information that are the normalized cornering stiffness Wa and the load dependence Wb of the normalized cornering stiffness, and the MF parameters $p_{Ky1}$, $p_{Ky2}$, which relationships of correspondence are expressed by above formula (11) and formula (12). Namely, it suffices to store the relationship of correspondence between the normalized cornering stiffness Wa serving as tire design information and the MF parameter $p_{Ky1}$ that relates to the normalized cornering stiffness, and the relationship of correspondence between the tire design information that is the load dependence Wb of the normalized cornering stiffness that serves as the tire design information and the MF parameter $p_{Ky2}$ that relates to the load dependence of the normalized cornering stiffness. Specifically, it suffices to store, in the storing section 18, the functions that are expressed by above formula (11) and formula (12), and whose inputs are Wa, Wb and whose outputs are $p_{Ky1}$, $p_{Ky2}$. Further, a large number of data sets in the relationships of correspondence between Wa, Wb and $p_{Ky1}$, $p_{Ky2}$ that are derived by using above formula (11) and formula (12) may be derived, and the derived data sets in the relationships of correspondence may be stored in the storing section 18.

Examples of information (tables of correspondence), which express the relationships of correspondence that are stored in the storing section 18, are shown in following Table 1 and Table 2. In Table 1, the relational expressions shown by above formula (11) and formula (12) are made into a table of correspondence as information expressing the relationships of correspondence between the tire design information and the MF parameters. In Table 2, data of inputs and outputs that are derived by using formula (11) and formula (12), i.e., plural data sets in the relationships of correspondence between the tire design information and the MF parameters, are made into a table of correspondence.

TABLE 1

| Tire design information (cornering stiffness) | Table of correspondence (relational expressions) | MF parameters |
|---|---|---|
| Wa, Wb | $p_{Ky2} = \sqrt{-\frac{2Wa}{WbF'_{z0}} - 1}$ <br> $p_{Ky1} = \frac{Wa}{\sin\left[2\mathrm{arctan}\left\{\frac{1}{p_{Ky2}}\right\}\right]}$ | $p_{ky1}$, $p_{ky2}$ |

TABLE 2

| Table of correspondence (data) | |
|---|---|
| Tire design information | MF parameters |
| Wa01, Wb01 | $p_{ky1}01$, $p_{ky2}01$ |
| Wa02, Wb02 | $p_{ky1}02$, $p_{ky2}02$ |
| . . . | . . . |
| WaM, WbM | $p_{ky1}M$, $p_{ky2}M$ |

Note that, for functions whose inputs are tire design information and whose outputs are MF parameters, it is also possible to derive the inverse function, and to derive the tire design information from the MF parameters by using this inverse function.

(Road Friction Coefficient)

Another example of the tire design information is described next. Here, description is given of the relationship of correspondence between tire design information and the MF parameters in a case in which the road friction coefficient is used as another example of the tire design information. Note that here, in order to simplify explanation, the conditions are made to be that the camber angle $\gamma$ is zero ($\gamma$=0) and there is a prescribed internal pressure (pressure increment dpi=0), from the standpoint of the aforementioned of a pure lateral slip. Under these conditions, road friction coefficient $\mu_y$ can be expressed by following formula (13).

[Numerical Formula 13]

$$\mu_y = (p_{Dy1} + p_{Dy2} df_z) \tag{13}$$

Further, the load change amount dfz can be expressed by following formula (14).

[Numerical Formula 14]

$$df_z = \frac{F_z - F'_{z0}}{F'_{z0}} \tag{14}$$

$F'_{z0}$ in the formula can be expressed by following formula (15). A in the formula represents the scale factor of the maximum friction coefficient relating to lateral force.

[Numerical Formula 15]

$$F'_{z0} = \lambda_{F_{z0}} F_{z0} \tag{15}$$

In a case in which the load is a prescribed load, the load change amount dfz is zero (dfz=0), the difference between the load and the prescribed load is 0, and the MF parameter $p_{Dy1}$ can be expressed by following formula (16).

[Numerical Formula 16]

$$p_{Dy1} = \mu_y \big|_{F_z = F'_{z0}} \tag{16}$$

On the other hand, when the load is n times (n is a real number) the prescribed load, the MF parameter $p_{Dy2}$ can be expressed by following formula (17) by using the MF parameter $p_{Dy1}$.

[Numerical Formula 17]

$$p_{Dy2} = \frac{\mu_y - p_{Dy1}}{df_z} = \frac{\mu_y - p_{Dy1}}{n-1} \tag{17}$$

Accordingly, it suffices to store, in the storing section 18, the relationships of correspondence between the tire design information that is the road friction coefficient $\mu_y$ and the MF parameters $p_{Dy1}$, $p_{Dy2}$, which relationships of correspondence are expressed by above formula (16) and formula (17). Namely, it suffices to store the relationship of correspondence between the road friction coefficient $\mu_y$ that serves as the tire design information and the MF parameter $p_{Dy1}$ that relates to the road friction coefficient, and the relationship of correspondence between the tire design information that is the load dependence of the road friction coefficient that is expressed by the load change amount dfz and serves as tire design information, and the MF parameter $p_{Dy2}$ that relates to the load dependence of the road friction coefficient. Specifically, it suffices to store, in the storing section 18, the functions that are expressed by above formula (16) and formula (17), whose inputs are $\mu_y$ and whose outputs are $p_{Dy1}$, $p_{Dy2}$. Further, a large number of data sets in the relationships of correspondence between $\mu_y$ and $p_{Dy1}$, $p_{Dy2}$ that are derived by using above formula (16) and formula (17) may be derived, and the derived data sets in the relationships of correspondence may be stored in the storing section 18.

Examples of information (tables of correspondence), which express the relationships of correspondence that are stored in the storing section 18, are shown in following Table 3 and Table 4. In Table 3, the relational expressions shown by above formula (16) and formula (17) are made into a table of correspondence as information expressing the relationships of correspondence between the tire design information and the MF parameters. In Table 4, data of inputs and outputs that are derived by using formula (16) and formula (17), i.e., plural data sets in the relationships of correspondence between the tire design information and the MF parameters, are made into a table of correspondence.

TABLE 3

| Tire design information (road friction coefficient) | Table of correspondence (relational expressions) | MF parameters |
|---|---|---|
| $\mu_y$ | $P_{Dy1} = \mu_y \vert_{F_z = F'_{z0}}$ <br> $p_{Dy2} = \frac{\mu_y - p_{Dy1}}{df_z} = \frac{\mu_y - p_{Dy1}}{n-1}$ | $p_{Dy1}$, $p_{Dy2}$ |

TABLE 4

| Table of correspondence (data) | |
|---|---|
| Tire design information | MF parameters |
| $\mu_y$01 | $p_{Dy1}$01, $p_{Dy2}$01 |
| $\mu_y$02 | $p_{Dy1}$02, $p_{Dy2}$02 |
| . . . | . . . |
| $\mu_y$M | $p_{Dy1}$M, $p_{dy2}$M |

The above-described analyzing device 1 can be realized by a computer system that includes a control section structured by a generic computer.

Figure 2:
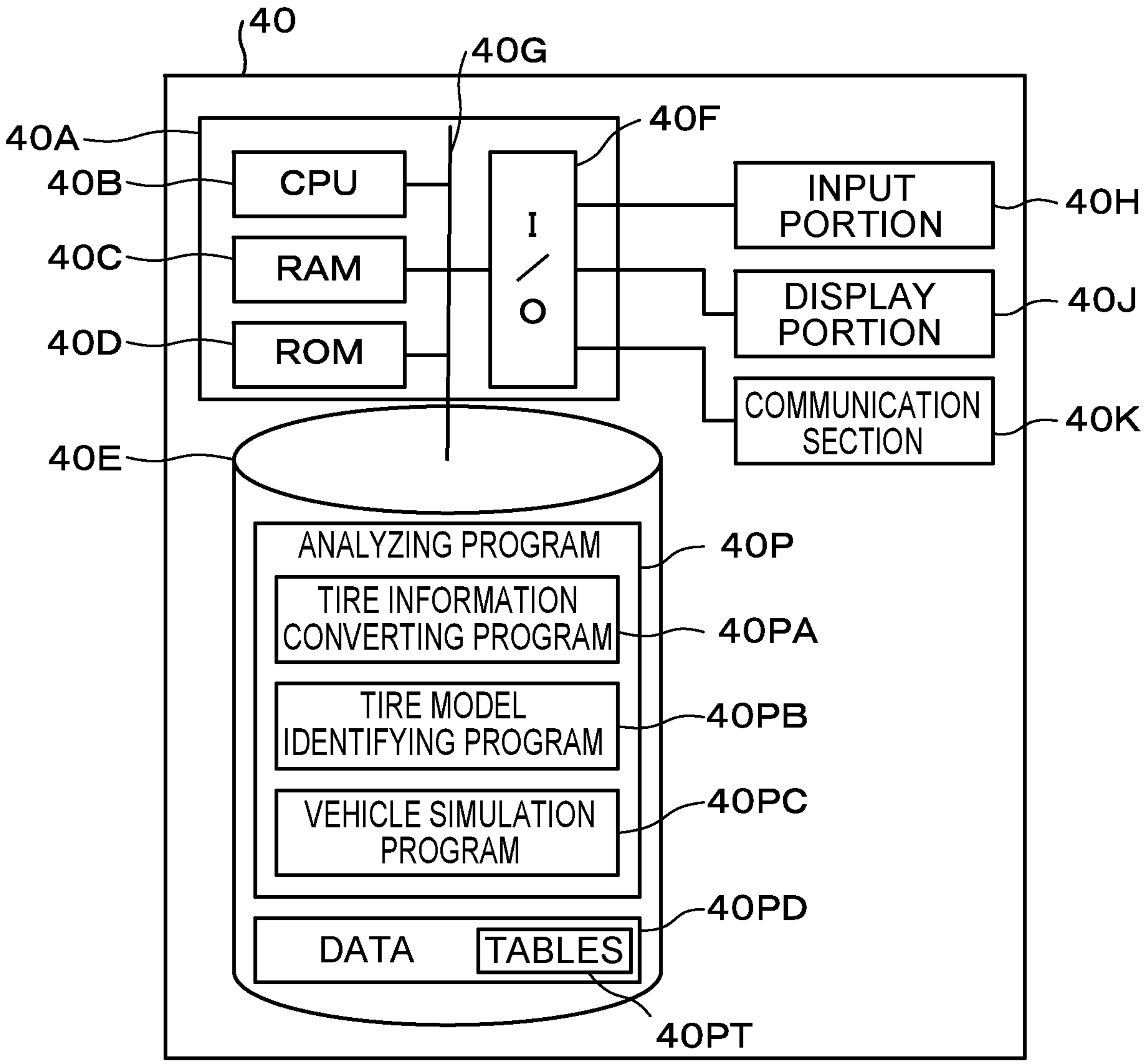
FIG. 2 is a block drawing illustrating an example of the schematic structure of a computer that can be made to function as the analyzing device relating to the first embodiment.

FIG. 2 illustrates the schematic structure of a computer 40 that can be made to function as the analyzing device 1.

The computer 40 that is illustrated in FIG. 2 and functions as the analyzing device 1 has a computer main body 40A. The computer main body 40A has a CPU 40B, a RAM 40C, a ROM 40D, and an input/output interface (I/O) 40F. These CPU 40B, RAM 40C, ROM 40D and I/O 40F are structures that are connected via bus 40G so as to be able to transfer data and commands to and from one another. An auxiliary storage device 40E, which functions as an auxiliary storage device such as a hard disk device (HDD) or the like, also is connected to the bus 40G. Further, an input portion 40H such as a keyboard or the like, a display portion 40J such as a display or the like, and a communication section 40K for communicating with external devices are connected to the I/O 40F.

An analyzing program 40P, which causes the computer main body 40A to function as the analyzing device, is stored in the auxiliary storage device 40E. The CPU 40B reads-out the analyzing program 40P from the auxiliary storage device 40E, and expands the program in the RAM 40C and executes processings. Due thereto, the computer main body 40A that executes the analyzing program 40P functions as the analyzing device 1 relating to the present embodiment.

The analyzing program 40P stored in the auxiliary storage device 40E includes a tire information converting program 40PA, a tire model identifying program 40PB and a vehicle simulation program 40PC. The tire information converting program 40PA is an example of a processing routine showing the process that is executed at the tire information converting section 10. The tire model identifying program 40PB is an example of a processing routine showing the process that is executed at the tire model identifying section 20. The vehicle simulation program 40PC is an example of a processing routine showing the process that is executed at the vehicle simulation section 30. Further, various types of data that are used in the analyzing processing are stored as data 40PD in the auxiliary storage device 40E. Tables 40PT, which include the above-described tables of correspondence (refer to Table 1 through Table 4), are stored in the data 40PD. Note that the auxiliary storage device 40E can function as the storing section 18 illustrated in FIG. 1.

Note that at least some of the program of the analyzing program 40P, and the data 40PD, may be provided to the exterior by a recording medium such as a CD-ROM or the like, or may be acquired from an external device via the communication section 40K.

The analyzing processing at the analyzing device 1 that is realized by a computer is described next.

Figure 3:
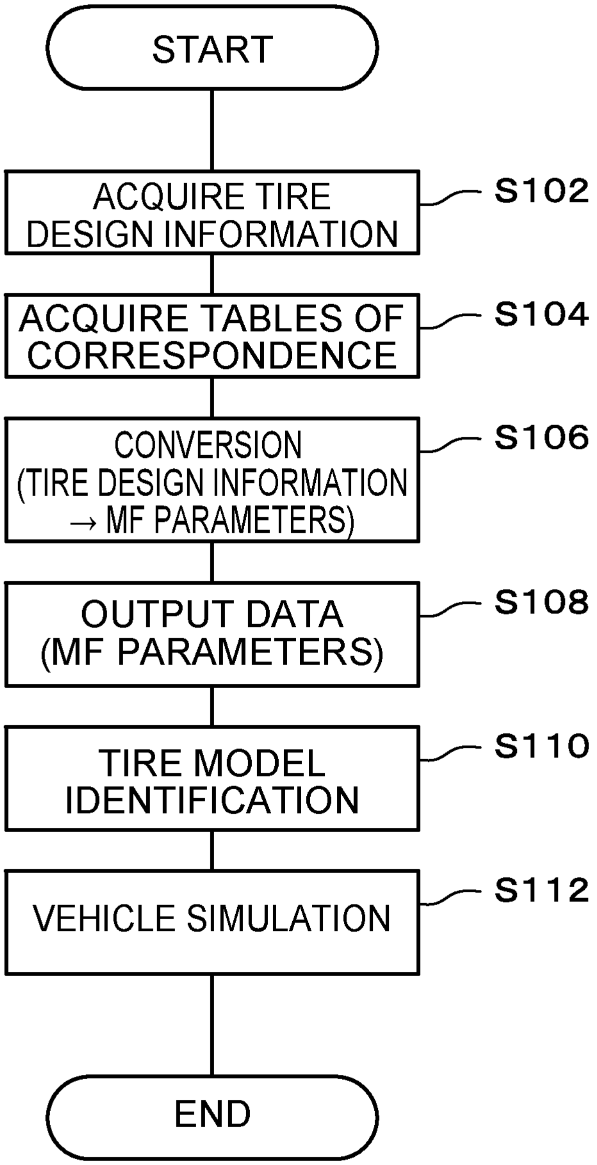
FIG. 3 is a flowchart illustrating an example of the flow of analyzing processing in accordance with an analyzing program executed at the computer relating to the first embodiment.

FIG. 3 illustrates an example of the flow of analyzing processing by the analyzing program 40P that is executed at the computer 40.

The analyzing processing illustrated in FIG. 3 is executed by the CPU 40B when the power of the computer 40 is turned on.

First, in step S102, the CPU 40B carries out control that acquires the tire design information. In step S102, the CPU 40B may carry out control that acquires tire design information that is stored in advance in the data 40PD of the auxiliary storage device 40E, or may carry out control that acquires the tire design information from an external device via the communication section 40K. Further, the CPU 40B may carry out control that acquires data, which is input at the input portion 40H, as the tire design information. The processing of step S102 is an example of the processing executed at the acquiring section 12 of the tire information converting section 10.

In next step S104, the CPU 40B carries out control that acquires tables of correspondence. In step S104, control that acquires the tables of correspondence (refer to Table 1 through Table 4), which are stored as the tables 40PT in the data 40PD of the auxiliary storage device 40E, is carried out. Note that the CPU 40B is not limited to using the tables of correspondence that are stored in the auxiliary storage device 40E, and may carry out control that acquires tables of correspondence from an external device via the communication section 40K. Further, the CPU 40B may carry out control that acquires data, which is input at the input portion 40H, as the tables of correspondence.

In next step S106, by using the acquired tire design information and tables of correspondence, the CPU 40B carries out control that derives the MF parameters, i.e., that converts the tire design information into MF parameters.

The processings of step S104 and step S106 are examples of the processings executed at the converting section 14 of the tire information converting section 10.

In next step S108, the CPU 40B carries out control that outputs, to the tire model identifying section 20, the MF parameters obtained by the processing of above-described step S106. Note that, in step S108, the CPU 40B may carry out control that displays the MF parameters on the display portion 40J, or may carry out control that outputs the MF parameters to an external device via the communication section 40K. The processing of step S106 is an example of the processing executed at the outputting section 16 of the tire information converting section 10.

The processings from above-described step S102 through step S108 are examples of processings executed at the tire information converting section 10.

In next step S110, the CPU 40B carries out control that identifies the tire model, i.e., the MF model, based on the MF parameters. The processing of step S110 is an example of the processing executed at the tire model identifying section 20.

In next step S112, the CPU 40B carries out control of a vehicle simulation by using the MF model identified in step S110. The processing of step S112 is an example of the processing executed at the vehicle simulation section 30.

Figure 4:
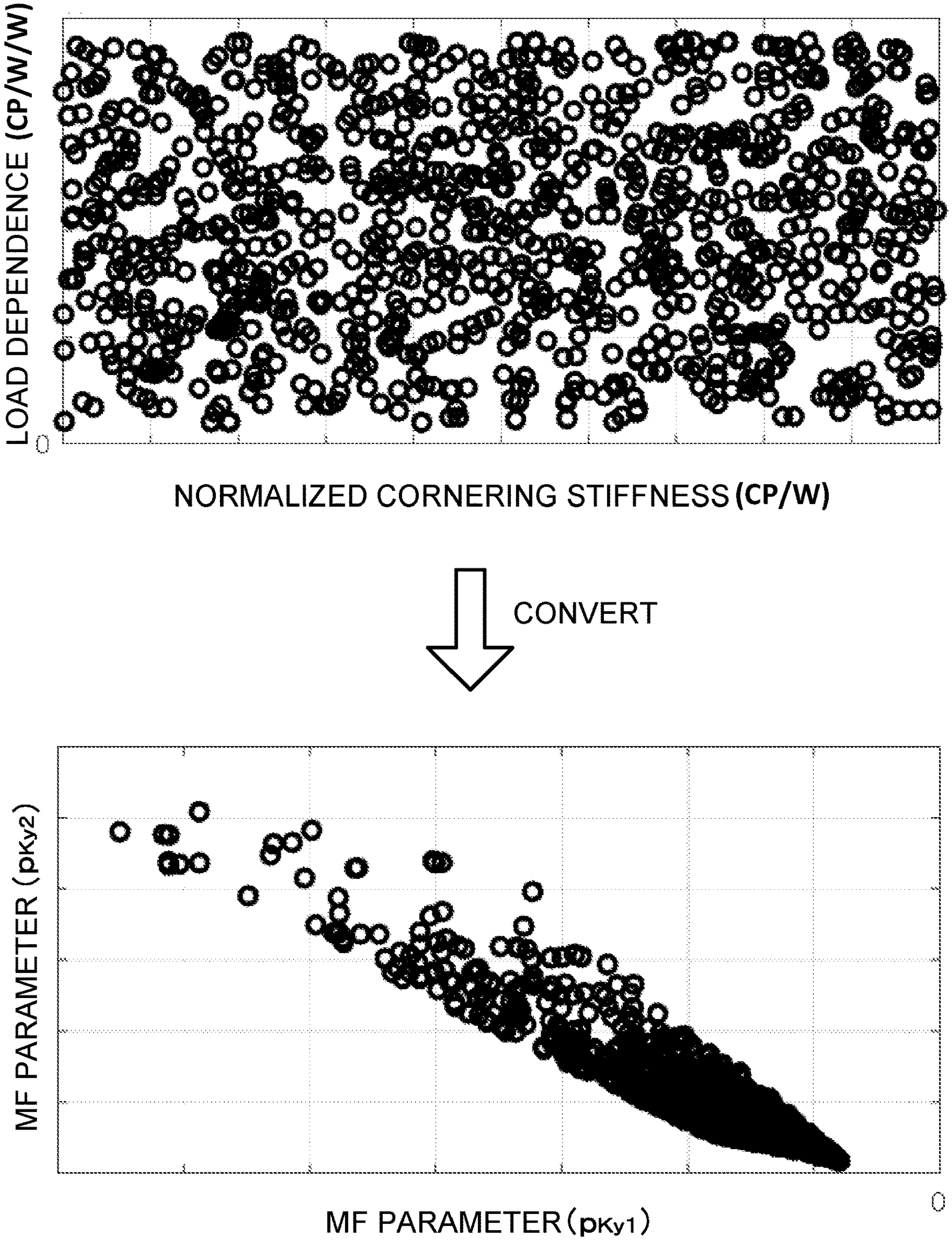
FIG. 4 is a drawing illustrating an example of the relationship between inputs and outputs at a tire information converting section of the analyzing device relating to the first embodiment.

FIG. 4 illustrates an example of the results of analyzing the relationship between the inputs and outputs of the tire information converting section 10 at the time when vehicle behavior is analyzed at the analyzing device 1 relating to the present embodiment, i.e., the relationship between the tire characteristic, which shows the tire design information, and the characteristic of the MF parameters. FIG. 4 illustrates, as the tire characteristic that shows the tire design information, the relationship between the normalized cornering stiffness and the load dependence of the normalized cornering stiffness. The characteristic of the MF parameters shows the relationship of the MF parameters $p_{Ky1}$, $p_{Ky2}$. As illustrated in FIG. 4, in the tire characteristic, the relationship between the normalized cornering stiffness and the load dependence of the normalized cornering stiffness is distributed randomly. In contrast, the characteristic of the MF parameters is a distribution in which, as the value of the MF parameter $p_{Ky2}$ increases, the range of the MF parameter $p_{Ky1}$ is a conical or bell-shaped range that widens. It is thought that the pattern illustrated in FIG. 4 emerges in this way in the relationship between the inputs and outputs of the tire information converting section 10. Accordingly, it can be confirmed that, by converting the tire design information within the range of the pattern illustrated in FIG. 4, the tire design information can be converted into parameters of an MF model that reflects the tire design information.

As described above, in accordance with the analyzing device of the present embodiment, tire behavior can be analyzed easily by an MF model, by using tire design information and without using data obtained by actually measuring tires. Further, by using a tire model that is in accordance with the MF model, vehicle simulation can be carried out easily while reflecting tire design information.

Second Embodiment

A second embodiment is described next. Note that, because the second embodiment is a structure that is similar to the first embodiment, the same portions are denoted by the same reference numerals, and detailed description is omitted.

In a case in which the above-described Magic Formula is used as a tire model, the direct relation between the parameters, which are for determining the coefficients that are to be used in the Magic Formula, and tire design information is weak, and it is difficult to explicitly reflect tire design information in the tire model. On the other hand, when using particular numerical formulas, which utilize tire design information, as the tire model, the tire model must be determined by using the particular numerical formulas, and it is difficult to use a generic tire model such as the Magic Formula or the like for example, and the convenience also deteriorates. Accordingly, tire behavior is analyzed in detail while taking tire design information into consideration and without using data obtained by actual measurement of tires.

It is particularly important to use tire design information that takes into consideration the dynamic characteristics of the slip angle and the lateral force of the tire. It is known that the dynamic characteristics of the slip angle and the lateral force of a tire are described by a parameter that is called the relaxation length that represents a transient characteristic of the tire. The relaxation length varies in accordance with various factors such as the ground-contact load and the like for example, and affects the handling performance. Accordingly, in cases of analyzing tire behavior while reflecting tire design information that takes the relaxation length into consideration, as described above, it is difficult to use a generic tire model such as the Magic Formula or the like for example.

Thus, the second embodiment describes a technique that makes it possible to easily carry out tire behavior analysis by using tire design information that includes information expressing transient characteristics of the tire, without using data obtained by actually measuring tires.

(Relaxation Length)

As described above, tire design information is a concept that includes data of tire specifications, and data expressing characteristics relating to the generated forces of tires. Examples of data of tire specifications are data expressing the structure, the shape and the materials of the tire. Examples of data expressing characteristics relating to the generated forces of tires are data expressing tire characteristics such as cornering stiffness, the road friction coefficient, self-aligning torque, and the like. In the present embodiment, the tire design information includes data expressing the relaxation length and the load dependence of the relaxation length.

A transient characteristic of a tire is a dynamic characteristic that arises due to forces to the tire. For example, it is known that the dynamic characteristics of the slip angle and the lateral force of a tire are described by a parameter that is called the relaxation length. The relaxation length varies in accordance with factors such as load and the like. The longer the relaxation length, the more that a delay in generation of the lateral force arises, and the more that deterioration of the handling performance is affected. Accordingly, the relaxation length of the tire can be treated as information expressing a transient characteristic of the tire. Further, because the relaxation length of the tire varies in accordance with the load, when taking transient characteristics of the tire into consideration, it is preferable to consider the relaxation length of the tire and the load dependence of the relaxation length of the tire. For example, the relationship between the relaxation length of the tire and load exhibits the characteristic (load dependence) that the relaxation length becomes longer as the load of the tire increases. Load dependence shows the tendency of the fluctuations in load. As the tendency of the load fluctuations, e.g., the load fluctuation rate, increases, the load dependence increases. In the present embodiment, as information expressing transient characteristics of the tire, respective information that are the relaxation length of the tire and the load dependence of the relaxation length of the tire are used as tire design information. Accordingly, it is possible to analyze tire behavior while reflecting tire design information that takes into consideration transient characteristics of the tire including the relaxation length and the load dependence of the relaxation length of the tire. Further, it is also possible to use a generic tire model such as the Magic Formula or the like.

In the present embodiment, in the same way as in the above-described embodiment, a tire model that outputs a physical amount relating to tire behavior in accordance with input parameters is used as the tire model. Further, in the same way as in the above-described embodiment, a model for determining various behaviors and states of a vehicle by using numerical analysis methods is used as the vehicle model as well.

In the same way as in the above-described embodiment, the analyzing device 1 (FIG. 1) of the present embodiment converts tire design information into parameters of a tire model at the tire information converting section 10, and determines a tire model, in which the tire design information is reflected, at the tire model identifying section 20, and carries out vehicle simulation by using the tire model at the vehicle simulation section 30. An MF model is used as the tire model.

Modeling of the lateral force $F_{yp}$ is possible by identifying the MF coefficients of above-described formula (1) by using the MF model expressed by formula (1). In the MF model, the simulation accuracy of the tire model is improved by using parameters relating to the tire such as $p_{Ty1}$, $p_{Ty2}$ and the like, and radius $R_0$ of the tire and the load change amount dfz, instead of using the MF coefficients as eigenvalues of the tire. $p_{Ty1}$, $p_{Ty2}$ are parameters relating to the relaxation length of the tire. Accordingly, in the MF model, by inputting parameters such as these $p_{Ty1}$, $p_{Ty2}$ and the like (hereinafter called MF parameters), the lateral force $F_{yp}$ that is generated at the tire can be derived highly accurately.

Note that, in a case of considering the lateral force $F_{yp}$ as the physical amount relating to tire behavior while taking the relaxation length of the tire into consideration, it suffices to identify $p_{Ty1}$, $p_{Ty2}$ as the MF parameters, and constants expressing standard values can be set as the other parameters.

The MF parameters are parameters that are determined by the derivation or the like of predetermined characteristics that are expressed by actually measured values of tires and the like, and it is thought that the tire design information is implicitly reflected in the tire model. Namely, it is difficult for the MF parameters to cause the tire design information to be explicitly reflected in the tire model (i.e., the MF model). In the present embodiment, by converting the tire design information into MF parameters at the tire information converting section 10, the tire design information can be explicitly reflected in the MF model.

The tire information converting section 10 of the present embodiment is described in detail next. In the same way as in the above-described embodiment, the tire information converting section 10 has the acquiring section 12, the converting section 14, the outputting section 16 and the storing section 18.

The tire information converting section 10 is an example of the tire behavior estimating device of the present disclosure. The storing section 18 is an example of the storing section of the present disclosure. The acquiring section 12 is an example of a functional section that carries out the processing of acquiring tire design information at the tire behavior estimating device of the present disclosure. Further, the converting section 14 is an example of a functional section that carries out the processing of converting data between tire design information and parameters that are used in the tire model, at the tire behavior estimating device of the present disclosure.

The relationships of correspondence between the tire design information that includes information expressing transient characteristics of the tire, and the MF parameters, which relationships of correspondence are stored in the storing section 18 as tables of correspondence, are described next. Here, explanation is given of a case in which the relaxation length of the tire is used as an example of the tire design information that includes information expressing transient characteristics of the tire. Further, the relaxation length of the tire at a prescribed load that is determined in advance is used in the present embodiment.

Aforementioned shape factor $C_y$ corresponds to the lateral stiffness at the time of rolling (an example of the tire design information), and relaxation length ($\sigma_y$) of the tire can be expressed by following formula (18).

[Numerical Formula 18]

$$\sigma_y = K_{ya}/C_y \tag{18}$$

$K_{y\alpha}$ in the formula is tire design information that is called the cornering stiffness.

By the way, when considering standard tire models that were used before a predetermined version of the MF (MF-Tyre 5.2), the relaxation length $\sigma_y$ of the tire can be expressed by following formula (19). Note that the scale factor is removed from formula (19).

[Numerical Formula 19]

$$\sigma_y = p_{Ty1}\sin\left\{2\arctan\left(\frac{F_z}{p_{Ty2}F'_{z0}}\right)\right\}R_0 \tag{19}$$

$F_z$ in the formula represents the load, and $F'_{z0}$ represents the prescribed load. $p_{Ty1}$, $p_{Ty2}$ are MF parameters relating to the relaxation length of the tire.

Here, a case is considered in which the relaxation length at the prescribed load is the input condition, and the load $F_z$ is the same as the prescribed load $F'_{z0}$ ($F_z=F'_{z0}$) as shown in following formula (20), and the relaxation length $\sigma_y$ of the tire is $q_1$ ($\sigma_y=q_1$). In this case, above formula (19) can be modified into formula (21).

[Numerical Formula 20]

$$\text{when } F_z = F'_{z0},\ \sigma_y = q_1 \tag{20}$$

[Numerical Formula 21]

$$q_1 = p_{Ty1}\sin\left\{2\arctan\left(\frac{1}{p_{Ty2}}\right)\right\}R_0 \tag{21}$$

In this way, the relaxation length ($q_1$) at the prescribed load can be expressed by the MF parameters ($p_{Ty1}$, $p_{Ty2}$). Hereinafter, there are cases in which description is given while calling the relaxation length at the prescribed load the relaxation length $q_1$.

Among the tire design information, the load dependence of the relaxation length of the tire is described next. The load dependence of the relaxation length of the tire can be derived by partial differentiation of the relaxation length ($\sigma_y$) of the tire by the load $F_z$ as shown in following formula (22).

[Numerical Formula 22]

$$\frac{\partial\sigma_y}{\partial F_z} = p_{Ty1}\cos\left[2\arctan\left(\frac{F_z}{p_{Ty2}F'_{z0}}\right)\right]\frac{2}{\left[\left(\frac{F_z}{p_{Ty2}F'_{z0}}\right)^2+1\right]}\frac{1}{p_{Ty2}F'_{z0}}R_0 \tag{22}$$

Here, when the load dependence at the prescribed load is used as an input condition (refer to formula (20)), formula (22) can be expressed by following formula (23). As shown by formula (24), given that the load dependence of the relaxation length of the tire at this time is $q_2$, the load dependence of the above-described relaxation length can be expressed by formula (25).

[Numerical Formula 23]

$$\left.\frac{\partial\sigma_y}{\partial F_z}\right|_{F_z=F_{z0}} = p_{Ty1}\cos\left[2\arctan\left(\frac{1}{p_{Ty2}}\right)\right]\cdot\frac{2p_{Ty2}^2}{1+p_{Ty2}^2}\cdot\frac{R_0}{p_{Ty2}F'_{z0}} \tag{23}$$

[Numerical Formula 24]

$$\left.\frac{\partial\sigma_y}{\partial F_z}\right|_{F_z=F_{z0}} = q_2 \tag{24}$$

[Numerical Formula 25]

$$q_2 = p_{Ty1}\cos\left[2\arctan\left(\frac{1}{p_{Ty2}}\right)\right]\cdot\frac{2p_{Ty2}^2}{1+p_{Ty2}^2}\cdot\frac{R_0}{p_{Ty2}F'_{z0}} \tag{25}$$

Next, as shown in formula (26), given that the internal term of the COS function is t, the relaxation length $q_1$ of the tire can be expressed by following formula (27). By arranging formula (27), the MF parameter $p_{TY1}$ can be expressed by formula (28).

[Numerical Formula 26]

$$t = 2\arctan\left(\frac{1}{p_{Ty2}}\right) \tag{26}$$

$$q_1 = p_{Ty1}\sin t\cdot R_0 \tag{27}$$

$$p_{Ty1} = \frac{q_1}{R_0\sin t} \tag{28}$$

Next, by arranging above formula (25), expression by following formula (29) is possible.

[Numerical Formula 27]

$$\begin{aligned} q_2 &= \frac{q_1}{R_0\sin t}\cos t\cdot\frac{2p_{Ty2}^2}{1+p_{Ty2}^2}\cdot\frac{R_0}{p_{Ty2}F'_{z0}} \\ &= \frac{q_1}{\tan t}\cdot\frac{2p_{Ty2}^2}{1+p_{Ty2}^2}\cdot\frac{1}{p_{Ty2}F'_{z0}} \end{aligned} \tag{29}$$

By arranging above formula (29) by applying a formula that is a multiple of the tan function, expression by following formula (30) is possible.

[Numerical Formula 28]

$$q_2 = \frac{q_1}{\tan t}\cdot\frac{2p_{Ty2}^2}{1+p_{Ty2}^2}\cdot\frac{1}{p_{Ty2}F'_{z0}} = q_1\frac{1-\tan^2\left(\frac{t}{2}\right)}{2\tan\left(\frac{t}{2}\right)}\cdot\frac{2p_{Ty2}^2}{1+p_{Ty2}^2}\cdot\frac{1}{p_{Ty2}F'_{z0}} = q_1\frac{1-\frac{1}{p_{Ty2}^2}}{2\cdot\frac{1}{p_{Ty2}}}\cdot\frac{2p_{Ty2}^2}{1+p_{Ty2}^2}\cdot\frac{1}{p_{Ty2}F'_{z0}} = q_1\cdot\frac{p_{Ty2}^2-1}{p_{Ty2}^2+1}\cdot\frac{1}{F'_{z0}} \quad (30)$$

By arranging above formula (30) in relation to the MF parameter $p_{Ty2}$, expression by following formula (31) is possible.

[Numerical Formula 29]

$$q_2(p_{Ty2}^2+1)F'_{z0} = q_1(p_{Ty2}^2-1) \quad (31)$$

Here, if the MF parameter $p_{Ty2}$ is considered to be a positive value, the MF parameter $p_{Ty2}$ can be expressed by following formula (32).

[Numerical Formula 30]

$$p_{Ty2} = \sqrt{\frac{q_1+q_2F'_{z0}}{q_1-q_2F'_{z0}}} \quad (32)$$

Further, by using above formula (21), the MF parameter $p_{Ty1}$ can be expressed by following formula (33). Accordingly, the MF parameter $p_{Ty1}$ can be derived by using the MF parameter $p_{Ty2}$.

[Numerical Formula 31]

$$p_{Ty1} = \frac{q_1}{R_0\sin\left[2\arctan\left(\frac{1}{p_{Ty2}}\right)\right]} \quad (33)$$

In this way, the relaxation length $q_1$ of the tire and the load dependence $q_2$ of the relaxation length of the tire, and the MF parameters $p_{Ty1}$, $p_{Ty2}$, have relationships of correspondence. Accordingly, it suffices to store, in the storing section 18, the relationships of correspondence between the tire design information that are the relaxation length $q_1$ of the tire and the load dependence $q_2$ of the relaxation length of the tire, and the MF parameters $p_{Ty1}$, $p_{Ty2}$, which relationships of correspondence are expressed by above formula (32) and formula (33). Namely, it suffices to store the relationship of correspondence between the relaxation length $q_1$ of the tire that serves as tire design information and the MF parameter $p_{Ty1}$ that relates to the load dependence $q_2$ of the relaxation length of the tire, and the relationship of correspondence between the tire design information that is the load dependence $q_2$ of the relaxation length of the tire serving as tire design information, and the MF parameter $p_{Ty2}$ that relates to the load dependence $q_2$ of the relaxation length $q_1$ of the tire. Specifically, it suffices to store, in the storing section 18, the functions that are expressed by above formula (32) and formula (33), whose inputs are $q_1$, $q_2$ and whose outputs are $p_{Ty1}$, $p_{Ty2}$. Further, a large number of data sets in the relationships of correspondence between $q_1$, $q_2$ and $p_{Ty1}$, $p_{Ty2}$ that are derived by using above formula (32) and (33) may be derived, and the derived data sets in the relationships of correspondence may be stored in the storing section 18.

Examples of information (tables of correspondence), which express the relationships of correspondence that are stored in the storing section 18, are illustrated in following Table 5 and Table 6. In Table 5, the relational expressions shown by above formula (32) and formula (33) are made into a table of correspondence as information expressing the relationship of correspondence between the tire design information and the MF parameters. In Table 6, data of inputs and outputs that are derived by using formula (32) and formula (33), i.e., plural data sets in the relationships of correspondence between the tire design information and the MF parameters, are made into a table of correspondence.

TABLE 5

| Tire design information (relaxation length) | Table of correspondence (relational expressions) | MF parameters |
|---|---|---|
| $q_1$, $q_2$ | $p_{Ty2} = \sqrt{\frac{q_1+q_2F'_{z0}}{q_1-q_2F'_{z0}}}$ <br> $p_{Ty1} = \frac{q_1}{R_0\sin\left[2\arctan\left(\frac{1}{p_{Ty2}}\right)\right]}$ | $p_{Ty1}$, $p_{Ty2}$ |

TABLE 6

| Table of correspondence (data) | |
|---|---|
| tire design information | MF parameters |
| $q_1$01, $q_2$01 | $p_{Ty1}$01, $p_{Ty2}$01 |
| $q_1$02, $q_2$02 | $p_{Ty1}$02, $p_{Ty2}$02 |
| . . . | . . . |
| $q_1$M, $q_2$M | $p_{Ty1}$M, $p_{Ty2}$M |

Note that, for functions whose inputs are tire design information and whose outputs are MF parameters, it is also possible to derive the inverse function, and to derive the tire design information from the MF parameters by using this inverse function.

The analyzing processing at the analyzing device 1 of the present embodiment is described next.

In the analyzing processing of the present embodiment, in the same way as in the above-described embodiment (FIG. 3), in step S102, the CPU 40B carries out control that acquires the tire design information.

In next step S104, the CPU 40B carries out control that acquires tables of correspondence. In step S104, control that acquires the tables of correspondence (refer to Table 5 and Table 6), which are stored as the tables 40PT in the data 40PD of the auxiliary storage device 40E, is carried out.

In next step S106, by using the acquired tire design information and tables of correspondence, the CPU 40B carries out control that derives the MF parameters, i.e., that converts the tire design information into MF parameters In next step S108, the CPU 40B carries out control that outputs, to the tire model identifying section 20, the MF parameters obtained by the processing of above-described step S106.

In next step S110, the CPU 40B carries out control that identifies the tire model, i.e., the MF model, based on the MF parameters.

In next step S112, the CPU 40B carries out control of a vehicle simulation by using the MF model identified in step S110.

Figure 5:
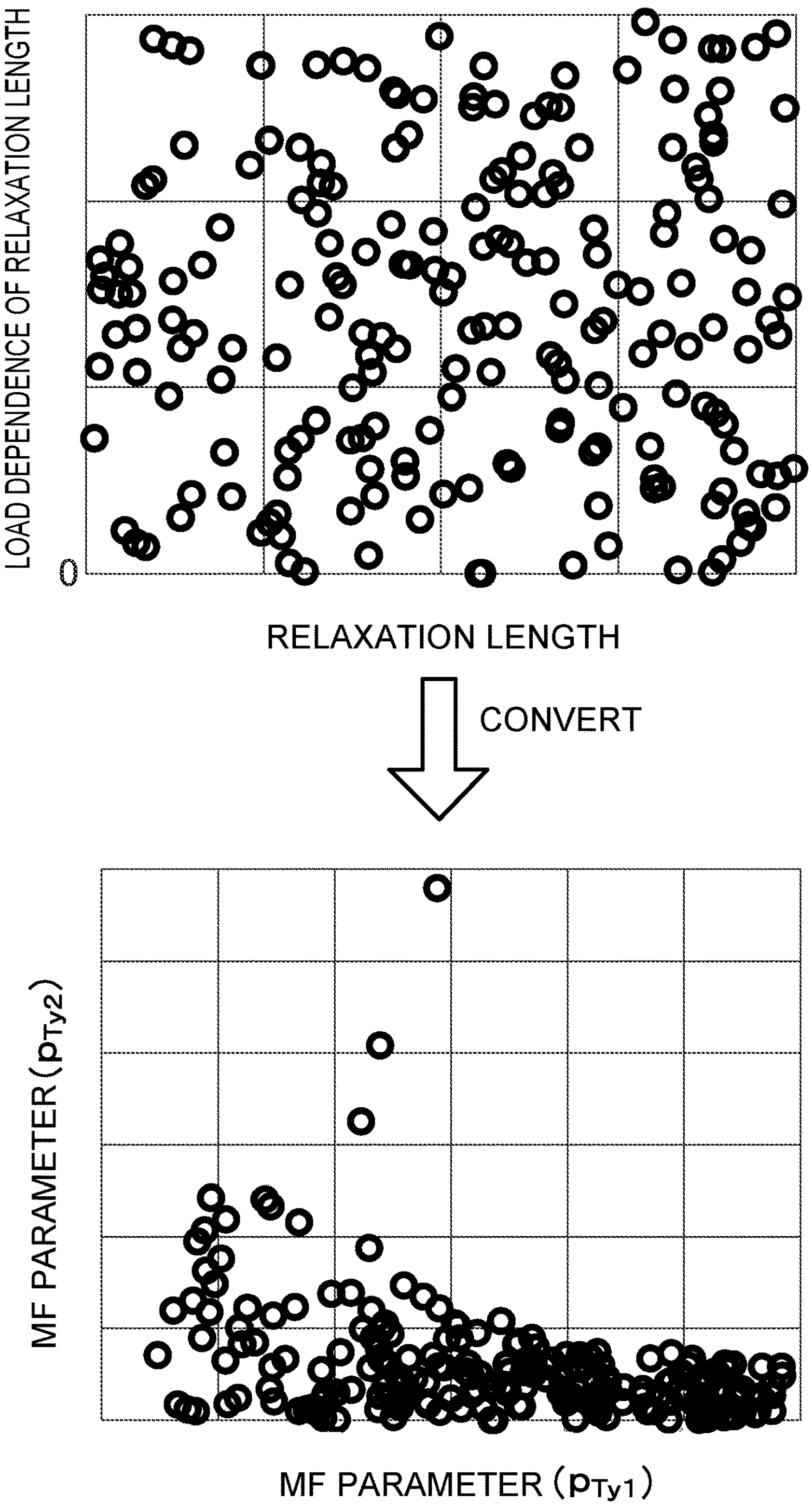
FIG. 5 is a drawing illustrating an example of the relationship between inputs and outputs at the tire information converting section of an analyzing device relating to a second embodiment.

FIG. 5 illustrates an example of the relationship of the inputs and outputs of the tire information converting section of the analyzing device relating to the present embodiment. FIG. 5 illustrates an example of the results of analyzing the relationship between the inputs and outputs of the tire information converting section 10 at the time of analyzing vehicle behavior at the analyzing device 1, i.e., the relationship between the tire characteristic, which shows the tire design information, and the characteristic of the MF parameters. Specifically, in FIG. 5, the tire characteristic shows the relationship between the relaxation length of the tire and the load dependence of the relaxation length. The characteristic of the MF parameters shows the relationship of the MF parameters $p_{Ty1}$, $p_{Ty2}$. As illustrated in FIG. 5, in the tire characteristic, the relationship between the relaxation length of the tire and the load dependence of the relaxation length is distributed randomly. In contrast, the characteristic of the MF parameters has the tendency of becoming a distribution in which, as the value of the MF parameter $p_{Ty2}$ increases, the more that the distribution gathers such that the range of the MF parameter $p_{Ty1}$ narrows, e.g., there becomes a distribution of a triangular or a conical range. It is thought that the pattern illustrated in FIG. 5 emerges in this way in the relationship between the inputs and outputs of the tire information converting section 10. Accordingly, it can be confirmed that, by converting the tire design information within the range of the pattern illustrated in FIG. 5, the tire design information can be converted into parameters of an MF model that reflects the tire design information.

Figure 6:
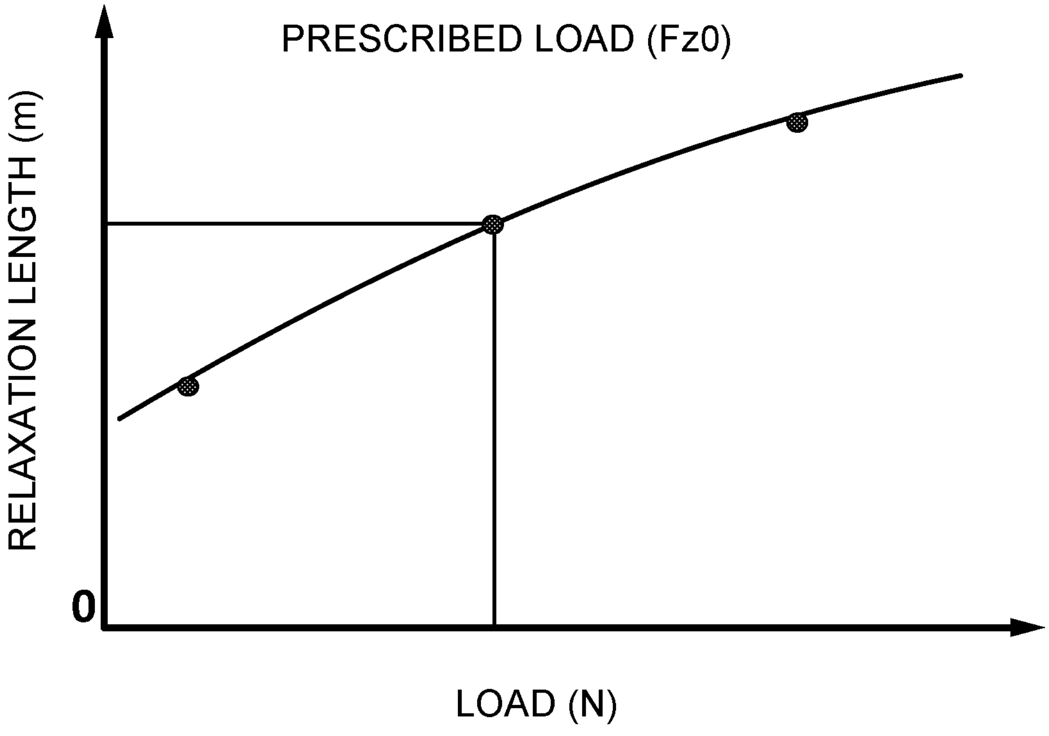
FIG. 6 is a drawing illustrating an example of transient characteristics relating to relaxation length of a tire relating to the second embodiment.

FIG. 6 illustrates results of verifying the relationship between the relaxation length of the tire and load, while taking into consideration transient characteristics of the tire (in the present embodiment, the relaxation length of the tire and the load dependence of the relaxation length of the tire) at the analyzing device 1 relating to the present embodiment. The black dots in FIG. 6 show the relationship between relaxation length and load in accordance with experiments using actual tires. The solid line in FIG. 6 shows, as tire behavior that is derived from tire design information by using the tire information converting section 10 at the analyzing device 1 relating to the present embodiment, the dynamic characteristic of the tire that shows the relationship between the relaxation length and the load. Specifically, the solid line in FIG. 6 shows the relationship between the relaxation length and load which is derived at an MF model by estimating the above-described MF parameters and using the results of estimation. In deriving this relationship between relaxation length and load, the relaxation length at the center load is used as the above-described relaxation length q1 of the tire, and the slope between the maximum load and the minimum load is used as the load dependence q2 of the relaxation length of the tire. As illustrated in FIG. 6, the results of experimentation in which actual tires were measured is a distribution that is extremely close to the relationship between relaxation length and load at the analyzing device 1 relating to the present embodiment. In this way, it could be confirmed that, by converting tire design information into parameters of an MF model that reflects tire design information by using the tire information converting section 10, it is possible to analyze tire behavior while reflecting transient characteristics of the tire in accordance with the relaxation length of the tire and the load dependence of the relaxation length of the tire. Namely, even in a case of using a generic tire model such as the Magic Formula or the like, it is possible to analyze tire behavior while reflecting tire design information that takes into consideration transient characteristics of the tire that include the relaxation length and the load dependence of the relaxation length of the tire.

As described above, in accordance with the analyzing device of the present embodiment, tire behavior can be analyzed easily by an MF model, by using tire design information and without using data obtained by actually measuring tires. Further, by using a tire model that is in accordance with the MF model, vehicle simulation can be carried out easily while reflecting tire design information.

Accordingly, in accordance with the present embodiment, behavior analysis of tires can be carried out easily by using tire design information that includes information expressing transient characteristics of tires, and without using data obtained by actual measurement of tires.

Third Embodiment

A third embodiment is described next. Note that, because the third embodiment is a structure that is similar to the first embodiment and the second embodiment, the same portions are denoted by the same reference numerals, and detailed description is omitted.

In a case in which the above-described MF model is used as a tire model, other than the above-described parameters, there are plural parameters that are for determining the coefficients that are to be used in the MF model, but the direct relation between these tire design information and parameters is weak, and it is difficult to explicitly reflect the tire design information in the MF model. Further, the above-described MF model has the improvement of the addition thereto of new parameters such that the applied range of modeling by the MF model is broader than that of previous MF models. The improved MF model can be handled as MF models of different types so as to be expressed as different versions, and the parameters also differ in accordance with the type of the MF model expressed by the version. Accordingly, the direct relation of the parameters in an MF model, which is expressed by a version, with tire design information is weak, and it is difficult to explicitly reflect the tire design information in the MF model.

Thus, the third embodiment describes a technique that makes it possible to easily carry out tire behavior analysis by using various tire design information in order to explicitly reflect these tire design information in the tire model.

Figure 7:
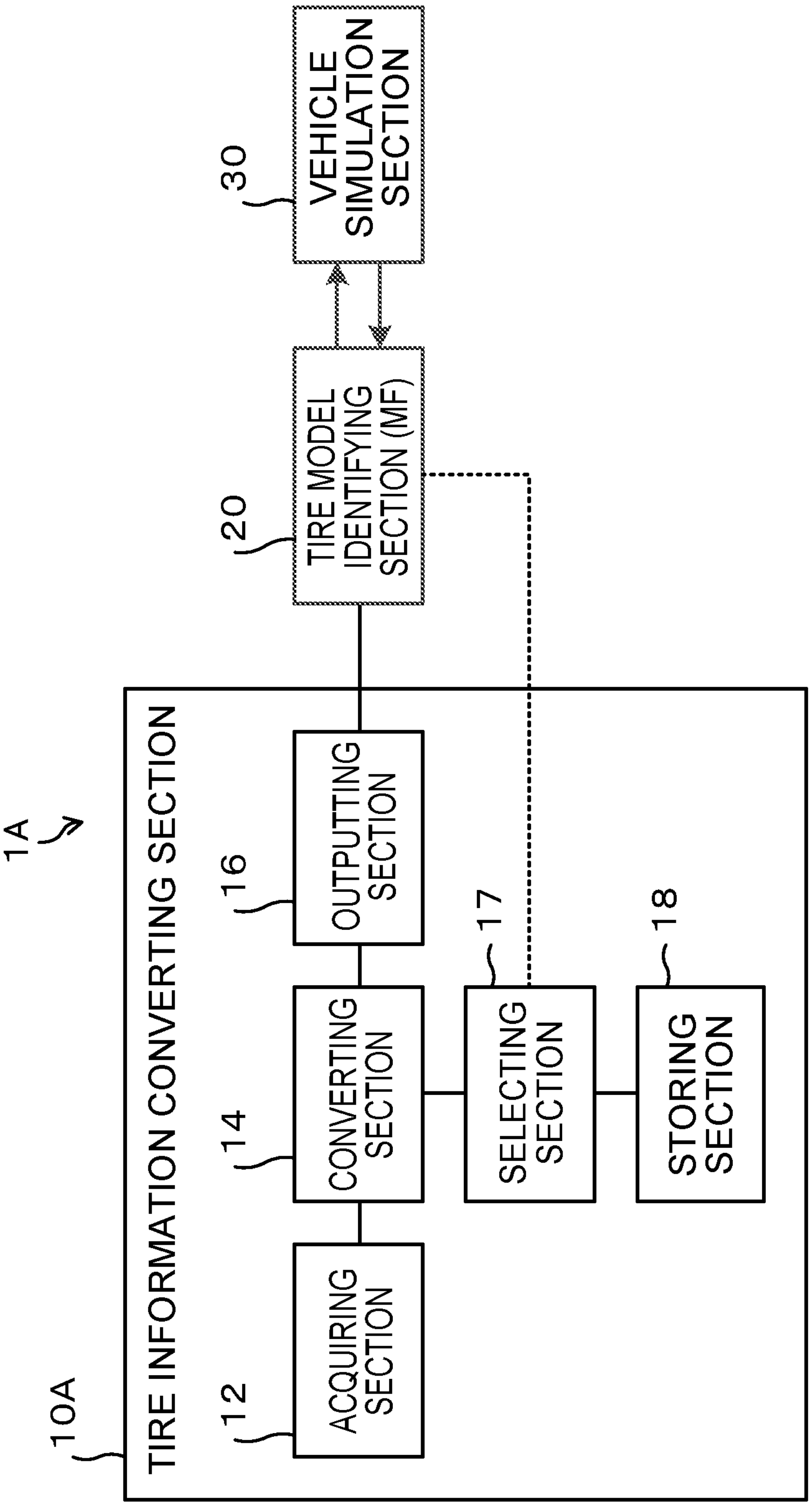
FIG. 7 is a schematic structural drawing illustrating an example of an analyzing device relating to a third embodiment.

FIG. 7 illustrates the structure of analyzing device 1A that is an example of a system including the tire behavior estimating device relating to the present embodiment. The analyzing device 1A has a tire information converting section 10A, the tire model identifying section 20, and the vehicle simulation section 30. In the same way as the above-described analyzing device 1, by inputting parameters relating to tire design information into a tire model, the analyzing device 1A identifies a tire model in which the tire design information is reflected, and carries out vehicle simulation by a vehicle model by using the identified tire model.

As compared with the above-described tire information converting section 10, the tire information converting section 10A further has a selecting section 17. Namely, the tire information converting section 10A has the acquiring section 12, the converting section 14, the outputting section 16, the selecting section 17, and the storing section 18. The tire information converting section 10 illustrated in FIG. 1 and the tire information converting section 10A illustrated in FIG. 7 differ in that the tire information converting section 10A additionally has the selecting section 17 as compared with the tire information converting section 10.

Information expressing relationships of correspondence between tire design information and MF parameters are stored as tables of correspondence in the storing section 18, in correspondence with the type of the MF model. In the present embodiment, a generic MF model that is standardly used, and an improved-version MF model in which the generic MF model has been improved, are examples of types of the MF model. An MF model that is a predetermined version (MF-Tyre 5.2) is an example of the generic MF model, and an MF model that is a later version (MF-Tyre 6.0 or later) is an example of the improved-version MF model. Hereinafter, as examples of the types of MF models, the generic MF model that is MF-Tyre 5.2 is called the first MF model, and the improved-version MF model that is MF-Tyre 6.0 or later is called the second MF model. Note that, in description that does not require differentiation of the type of the MF model, the first MF model will be described as the MF model that is the subject. The second MF model is described also in publications such as the MF-Tyre/MF-Swift 6.2 Equation Manual and Help Manual and the like.

In the present embodiment, based on the tables of correspondence that are stored in the storing section 18, the converting section 14 converts the data, which expresses the tire design information acquired by the acquiring section 12, into data expressing MF parameters that correspond to the type of the MF model. The selecting section 17 is a functional section that, from among the tables of correspondence that are stored in the storing section 18 and correspond to the types of MF models, selects the tables of correspondence that have been designated as the type of the MF model. The designating of the type of the MF model can be carried out by information input to the input portion 40H (see FIG. 2) by a user being acquired, and the type being designated by an input instruction that indicates the type of the MF model that is in accordance with the acquired input information. Further, the designating of the type of the MF model can be carried out by, as shown by the dashed line in FIG. 7, information, which expresses the type of the MF model that was determined at the tire model identifying section 20, being acquired from the tire model identifying section 20, and the type being designated by the information expressing the type of the MF model that is in accordance with the acquired information. The outputting section 16 inputs the data, which expresses the MF parameters that correspond to the type of the MF model and that were converted at the converting section 14, into the MF model that corresponds to the type (i.e., outputs the data to the tire model identifying section 20).

Next, the relationships of correspondence between the tire design information and the MF parameters, which are stored in the storing section 18 as tables of correspondence that correspond to the types of the MF models, are described.

(Self-Aligning Torque Stiffness)

Self-aligning torque stiffness is described as a first example of tire design information relating to the present embodiment. Here, normalized self-aligning torque stiffness at a prescribed load that is determined in advance is used. Self-aligning torque (SAT) is the moment that is generated (the torque that is generated) at the time when the tire is inclined laterally.

The lateral force $F_{yp}$ can be modeled by identifying the MF coefficients of above formula (1) by using the MF model expressed by formula (1). In the MF model, the simulation accuracy of the tire model is improved by using MF parameters $q_{Dz1}$, $q_{Dz2}$ instead of using the MF coefficients as eigenvalues of the tire. $q_{Dz1}$, $q_{Dz2}$ are parameters relating to the self-aligning torque stiffness of the tire. Accordingly, in the MF model, by inputting these $q_{Dz1}$, $q_{Dz2}$ and MF parameters, the lateral force $F_{yp}$ generated at the tire can be derived with high accuracy.

The lateral force $F_{yp}$ derived from the above-described MF model is expressed by above formula (1). Here, the self-aligning torque moment (SAT: Self Aligning Torque) is expressed by following formula (34).

[Numerical Formula 32]

$$M_z = -t\cdot(F_y - S_{Vyk}) + M_{zr} + s\cdot F_x \tag{34}$$

Formula (34) is an example expressing the SAT in the first MF model (MF-Tyre 5.2). In the formula, t is a value determined in association with the lateral force $F_y$, and represents the pneumatic trail (e.g., the point where the moment of the lateral force distribution becomes 0) that is related to the cornering stiffness. $S_{Vyk}$ is a coefficient that is called the shift amount. $M_{zr}$ represents the self-aligning moment that remains. s is a coefficient that determines the shift amount. $F_x$ represents the longitudinal force.

On the other hand, the SAT in the second MF model (MF-Tyre 6.0 or later) is expressed by following formula (35)

[Numerical Formula 33]

$$M_z = -t\cdot F_{y0} - G_{y\kappa 0} + M_{zr} + s\cdot F_x \tag{35}$$

In above formula (35), $F_{y0}\cdot G_{y\kappa 0}$ represents the lateral force at a camber angle of zero and turn slip of zero.

Here, when the tire is in simple slip state (pure slip), the coefficients relating to the slip such as the slip angle and the slip ratio and the like can be simplified (coefficients s, $\gamma$, $S_{Vyk}$=0). Further, when considering that the SAT that arises accompanying the slip angle is generated together with lateral force via the pneumatic trail t, the self-aligning moment that remains can be ignored ($M_{zr}$=0). Accordingly, the self-aligning torque stiffness that is normalized at the load is expressed by following formula (36). Following formula (36) expresses the self-aligning torque stiffness that is normalized at the load, in relation to the first MF model (MF-Tyre 5.2).

[Numerical Formula 34]

$$\begin{aligned} C_{Mz} &= \frac{\partial M_z}{\partial \alpha_F}\frac{1}{F_z} \\ &= -\frac{1}{F_z}\left(\frac{\partial t}{\partial \alpha_F}\cdot F_y + t\cdot\frac{\partial F_y}{\partial \alpha_F}\right) \end{aligned} \tag{36}$$

Here, the condition that the linear range, i.e., $\alpha_F$, is substantially zero is the same as in the second MF model (MF-Tyre 6.0 or later). Accordingly, the normalized self-aligning torque stiffness can be approximated by following formula (37) by using normalized cornering stiffness $C_{y\alpha}$ (written as Wa in the above-described embodiment).

[Numerical Formula 35]

$$C_{Mz} = -t \cdot C_{y\alpha} \tag{37}$$

The above-described pneumatic trail t is expressed by following formula (38).

[Numerical Formula 36]

$$t = D_t \cos\left[C_t \arctan\left\{B_t\alpha_{t,eq} - E_t(B_t\alpha_{t,eq} - \arctan(B_t\alpha_{t,eq}))\right\}\right] \cdot \cos(\alpha_M) \tag{38}$$

Here, under the condition that the linear range, i.e., $\alpha_F$, is substantially zero, if the prescribed internal pressure and the camber angle are made to zero, the turn slip is made to be zero, the scale factor is made to be 1, and the MF parameters $q_{Dz1}$, $q_{Dz2}$ are used, formula (38) can be simplified by following formula (39). Note that Dt is a coefficient representing the peak value.

[Numerical Formula 37]

$$\begin{aligned} t &= D_t \\ &= F_z \cdot (q_{Dz1} + q_{Dz2} df_z) \cdot \frac{R_0}{F'_{z0}} \end{aligned} \tag{39}$$

By using above formula (39), the normalized self-aligning torque stiffness can be expressed by following formula (40).

[Numerical Formula 38]

$$\begin{aligned} C_{Mz} &= -t \cdot C_{y\alpha} \\ &= -F_z \cdot (q_{Dz1} + q_{Dz2} df_z) \cdot \frac{R_0}{F_{z0}} \cdot C_{y\alpha} \end{aligned} \tag{40}$$

Further, the load dependence of the normalized self-aligning torque stiffness can be expressed as per following formula (41).

[Numerical Formula 39]

$$\begin{aligned} \frac{\partial C_{Mz}}{\partial F_z} &= -\frac{\partial t}{\partial F_z} \cdot C_{y\alpha} - \frac{\partial C_{y\alpha}}{\partial F_z} \cdot t \\ &= -(q_{Dz1} + q_{Dz2}) \cdot \frac{R_0}{F'_{z0}} \cdot C_{y\alpha} - F_z \cdot (q_{Dz1} + q_{Dz2} df_z) \cdot \frac{R_0}{F'_{z0}} \frac{\partial C_{y\alpha}}{\partial F_z} \\ &\equiv \varepsilon_{Mz} \end{aligned} \tag{41}$$

In the present embodiment, at the tire information converting section 10, the tire design information is acquired and is converted into MF parameters. In above formulas (40) and (41), applying the symbol (*) to the above-described variables at the prescribed load in order to clearly indicate the acquired tire design information results in expression by following (42) and (43).

[Numerical Formula 40]

$$C^*_{Mz} = -q_{Dz1} \cdot R_0 \cdot C^*_{y\alpha} \tag{42}$$

$$\varepsilon^*_{Mz} = -(q_{Dz1} + q_{Dz2}) \cdot \frac{R_0}{F'_{z0}} \cdot C^*_{y\alpha} - q_{Dz1} \cdot R_0 \cdot \varepsilon^*_{y\alpha} \tag{43}$$

Arranging above formula (42) and formula (43) in relation to the MF parameters results in expression by following formula (44) and (45).

[Numerical Formula 41]

$$q_{Dz1} = -\frac{C^*_{Mz}}{R_0 \cdot C^*_{y\alpha}} \tag{44}$$

$$q_{Dz2} = \frac{1}{R_0 \cdot C^*_{y\alpha}}\left[C^*_{Mz} - F'_{z0} \cdot \left(\varepsilon^*_{Mz} - \frac{\varepsilon^*_{y\alpha} C^*_{Mz}}{C^*_{y\alpha}}\right)\right] \tag{45}$$

In this way, there are relationships of correspondence between the self-aligning torque stiffness $C_{Mz}$* of the tire and the load dependence $\varepsilon_{Mz}$* thereof, and the MF parameters $q_{Dz1}$, $q_{Dz2}$. Accordingly, it suffices to store, in the storing section 18, the relationships of correspondence between the tire design information that is the self-aligning torque stiffness $C_{Mz}$* of the tire and the load dependence $\varepsilon_{Mz}$* thereof, and the MF parameters $q_{Dz1}$, $q_{Dz2}$, which relationships of correspondence are expressed by above formula (44) and formula (45). Namely, it suffices to store the relationship of correspondence between the normalized self-aligning torque stiffness $C_{Mz}$* serving as tire design information and the MF parameter $q_{Dz1}$ that relates to the normalized self-aligning torque stiffness $C_{Mz}$*, and the relationship of correspondence between the tire design information that is the load dependence $\varepsilon_{Mz}$* of the normalized self-aligning torque stiffness that serves as the tire design information and the MF parameter $q_{Dz2}$ that relates to the load dependence $\varepsilon_{Mz}$* of the normalized self-aligning torque stiffness.

Examples of information (a table of correspondence), which express the relationships of correspondence that are stored in the storing section 18, are illustrated in following Table 7. In Table 7, the relational expressions shown by above formula (44) and formula (45) are made into a table of correspondence as information expressing the relationships of correspondence between the tire design information and the MF parameters.

TABLE 7

| Tire design information (self-aligning torque stiffness) | Table of correspondence (relational expressions) | MF parameters |
|---|---|---|
| $C_{Mz}$*, $\varepsilon_{Mz}$* | $q_{Dz1} = -\frac{C^*_{Mz}}{R_0 \cdot C^*_{y\alpha}}$ <br> $q_{Dz2} = \frac{1}{R_0 \cdot C^*_{y\alpha}}\left[C^*_{Mz} - F'_{z0} \cdot \left(\varepsilon^*_{Mz} - \frac{\varepsilon^*_{y\alpha} C^*_{Mz}}{C^*_{y\alpha}}\right)\right]$ | $q_{Dz1}$, $q_{Dz2}$ |

Note that, in the same way as in the above-described embodiment, data of inputs and outputs that are derived by using formula (44) and formula (45), i.e., plural data sets in the relationships of correspondence between the tire design information and the MF parameters, may be stored as a table of correspondence. Further, for functions whose inputs are the tire design information and whose outputs are the MF parameters, it is also possible to derive the inverse function, and to derive the tire design information from the MF parameters by using this inverse function.

(Camber Stiffness)

Camber stiffness is described as a second example of tire design information. Here, normalized camber stiffness at a prescribed load that is determined in advance is used. Further, the camber stiffness differs in accordance with the type of the MF model. Here, description is given with respect to the first MF model and the second MF model, respectively.

The camber stiffness can be derived by identifying a force generated at the time when the tire is inclined, by using the MF model that can be modeled by above formula (1). In the first MF model, the simulation accuracy of the tire model is improved by using the MF parameters of $p_{Vy3}$, $p_{Vy4}$ instead of using the MF coefficients as eigenvalues of the tire. $p_{Vy3}$, $p_{Vy4}$ are parameters relating to the camber stiffness of the tire. Accordingly, in the first MF model, by inputting these MF parameters $p_{Vy3}$, $p_{Vy4}$, the force generated at the time when the tire is inclined can be derived with high accuracy.

Further, in the second model, the simulation accuracy of the tire model is improved by using the MF parameters of $p_{Ky6}$, $p_{Ky7}$ instead of using the MF coefficients as eigenvalues of the tire. $p_{Ky6}$, $p_{Ky7}$ are parameters relating to the camber stiffness of the tire. Accordingly, in the second MF model, by inputting these $p_{Ky6}$, $p_{Ky7}$ and MF parameters, the force generated at the time when the tire is inclined can be derived with high accuracy.

The normalized camber stiffness is defined by following formula (46).

[Numerical Formula 42]

$$C_{y\gamma} = \frac{\partial F_{yp}}{\partial \gamma}\frac{1}{F_z} \tag{46}$$

Here, a case is considered in which the prescribed internal pressure and the camber angle are made to zero, the turn slip is made to be zero, and the scale factor is made to be 1 ($\alpha_F$=, dpi=0, MF internal variable $\zeta$=1). The normalized camber stiffness is expressed by following formula (47) in relation to the first MF model, and is expressed by formula (48) in relation to the second MF model.

[Numerical Formula 43]

$$C_{y\gamma} = \frac{K_{y\gamma 0}}{F_z} = \frac{1}{F_z}\cdot[p_{Hy3}K_{y\alpha 0} + F_z(p_{Vy3} + p_{Vy4}df_z)] \tag{47}$$

$$C_{y\gamma} = p_{Ky6} + p_{Ky7}df_z \tag{48}$$

In the first MF model, the linkage term with the cornering stiffness is considered, but, in consideration of the difference in the lateral force generating mechanisms, if the coefficient relating to the shifting that accompanies the camber is treated as zero ($p_{Hy3}$=0), the normalized camber stiffness can be expressed by following formula (49) as a polynomial expression that is similar to the second model.

[Numerical Formula 44]

$$C_{y\gamma} = p_{Vy3} + p_{Vy4}df_z \tag{49}$$

On the other hand, the load dependence of the normalized camber stiffness can be expressed by following formula (50) in relation to the first MF model, and by formula (51) in relation to the second MF model.

$$\frac{\partial C_{y\gamma}}{\partial F_z} = \frac{p_{Vy4}}{F'_{z0}} \equiv \varepsilon_{y\gamma} \tag{50}$$

$$\frac{\partial C_{y\gamma}}{\partial F_z} = \frac{p_{Ky7}}{F'_{z0}} \equiv \varepsilon_{y\gamma} \tag{51}$$

In the formulas from above formula (48) through formula (51), the symbol (*) is applied to the above-described variables at the prescribed load in order to clearly indicate the acquired tire design information, and the normalized camber stiffness and load dependence thereof that relate to the first MF model are expressed by following formula (52) and formula (53). Further, the normalized camber stiffness and load dependence thereof that relate to the second MF model are expressed by following formula (54) and formula (55).

[Numerical Formula 45]

$$C^*_{y\gamma} = p_{Vy3} \tag{52}$$

$$\varepsilon^*_{y\gamma} = \frac{p_{Vy4}}{F'_{z0}} \tag{53}$$

$$C^*_{y\gamma} = p_{Ky6} \tag{54}$$

$$\varepsilon^*_{y\gamma} = \frac{p_{Ky7}}{F'_{z0}} \tag{55}$$

Arranging the formulas from above formula (52) through formula (55) into formulas with respect to the MF parameters can result in expression by following formulas (56) through (59).

[Numerical Formula 46]

$$p_{Vy3} = C^*_{y\gamma} \tag{56}$$

$$p_{Vy4} = \varepsilon^*_{y\gamma}\cdot F'_{z0} \tag{57}$$

$$p_{Ky6} = C^*_{y\gamma} \tag{58}$$

$$p_{Ky7} = \varepsilon^*_{y\gamma}\cdot F'_{z0} \tag{59}$$

In this way, in relation to the first MF model, there are relationships of correspondence between the camber stiffness $C_{y\gamma}$* of the tire and the load dependence $\varepsilon_{y\gamma}$* thereof, and the MF parameters $p_{Vy3}$, $p_{Vy4}$. Accordingly, it suffices to store, in the storing section 18, the relationships of correspondence between the tire design information that is the camber stiffness $C_{y\gamma}$* of the tire and the load dependence $\varepsilon_{y\gamma}$* thereof, and the MF parameters $p_{Vy3}$, $p_{Vy4}$, which relationships of correspondence are expressed by above formula (56) and formula (57). Namely, it suffices to store the relationship of correspondence between the normalized camber stiffness $C_{y\gamma}$* that serves as tire design information and the MF parameter $p_{Vy3}$ that relates to the normalized camber stiffness, and the relationship of correspondence between the tire design information that is the load dependence $\varepsilon_{y\gamma}$* of the normalized camber stiffness that serves as the tire design information and the MF parameter $p_{Vy4}$ that relates to the load dependence $\varepsilon_{y\gamma}$* of the normalized camber stiffness.

Further, in relation to the second MF model, there are relationships of correspondence between the camber stiffness $C_{y\gamma}$* of the tire and the load dependence $\varepsilon_{y\gamma}$* thereof, and the MF parameters $p_{Ky6}$, $p_{Ky7}$. Accordingly, it suffices to store, in the storing section 18, the relationships of correspondence between the design information that is the camber stiffness $C_{y\gamma}$* of the tire and the load dependence $\varepsilon_{y\gamma}$* thereof, and the MF parameters $p_{Ky6}$, $p_{Ky7}$, which relationships of correspondence are expressed by above formula (56) and formula (57).

Examples of information (a table of correspondence), which express the relationships of correspondence that are stored in the storing section 18, in relation to the first MF model are illustrated in following Table 8. In Table 8, the relational expressions shown by above formula (56) and formula (57) are made into a table of correspondence as information expressing the relationships of correspondence between the tire design information and the MF parameters. Further, in Table 9, the relational expressions shown by above formula (58) and formula (59) are made into a table of correspondence as information expressing the relationships of correspondence between the tire design information and the MF parameters, in relation to the second model.

TABLE 8

| Tire design information (camber stiffness) | Table of correspondence (relational expressions) | MF parameters |
|---|---|---|
| $c_{y\gamma}$*, $\varepsilon_{y\gamma}$* | $p_{Vy3} = C_{y\gamma}$*<br>$p_{Vy4} = \varepsilon_{y\gamma}$* · $F'_{z0}$ | $p_{Vy3}$, $p_{Vy4}$ |

TABLE 9

| Tire design information (camber stiffness) | Table of correspondence (relational expressions) | MF parameters |
|---|---|---|
| $c_{y\gamma}$*, $\varepsilon_{y\gamma}$* | $p_{Ky6} = C_{y\gamma}$*<br>$p_{Ky7} = \varepsilon_{y\gamma}$* · $F'_{z0}$ | $p_{ky6}$, $p_{Dz9ky7}$ |

(Camber Torque Stiffness)

Next, camber torque stiffness is described as a third example of the tire design information. Here, normalized camber torque stiffness at a prescribed load that is determined in advance is used. In the same way as self-aligning torque (SAT), camber torque is the moment that is generated (the torque that is generated) at the time when the tire is inclined laterally. The camber torque includes a portion in which the torque, which relates to the camber portion, is determined in accordance with the self-aligning torque (SAT), and therefore, is derived while taking the self-aligning torque (SAT) into consideration.

Here, the simulation accuracy of the tire model is improved by using MF parameters in accordance with $q_{Dz8}$, $q_{Dz9}$ instead of using the MF coefficients as eigenvalues of the tire. $q_{Dz8}$, $q_{Dz9}$ are parameters relating to the camber torque stiffness of the tire. Accordingly, in the MF model, by inputting these $q_{Dz8}$, $q_{Dz9}$ and MF parameters, the lateral force $F_{yp}$ generated at the tire can be derived with high accuracy.

The self-aligning torque (SAT) is expressed by above formula (34). With regard to this self-aligning torque (SAT), the self-aligning moment ($M_{zr}$) that remains at the time when the tire is inclined laterally is expressed by following formula (60). Note that $\zeta_7$ is an internal coefficient of the MF.

[Numerical Formula 47]

$$M_{zr} = D_r \cos\left[\zeta_7 \arctan\left(B_r \alpha_{r,eq}\right)\right] \tag{60}$$

Further, the normalized camber torque stiffness is defined by following formula (61).

[Numerical Formula 48]

$$C_{M\gamma} = \frac{\partial M_z}{\partial \gamma}\frac{1}{F_z} \tag{61}$$

Here, because the self-aligning torque (SAT) that is due to the camber angle is generated by a mechanism that is different than the self-aligning torque (SAT) that is due to the lateral force, the component $M_{zr}$ is kept in above formula (61). Further, here, there is the condition that a state in which only the camber angle is generated is considered, and, given that the coefficients relating to the slip are made to be predetermined initial values (s=0, $\alpha_F$=0, $S_{Vyk}$=0), normalized camber torque stiffness ($C_{M\gamma}$) can be expressed by following formula (62).

[Numerical Formula 48]

$$\begin{aligned} C_{M\gamma} &= \frac{\partial M_z}{\partial \gamma}\frac{1}{F_z} \\ &= \frac{\partial}{\partial \gamma}\left(-t \cdot F_y + M_{zr}\right)\frac{1}{F_z} \\ &= \left(-\frac{\partial t}{\partial \gamma}\cdot F_y - \frac{\partial F_y}{\partial \gamma}\cdot t + \frac{\partial M_{zr}}{\partial \gamma}\right)\frac{1}{F_z} \end{aligned} \tag{62}$$

Further, if a linear range, i.e., $\gamma$=0, and a prescribed internal pressure are made to be the conditions, the normalized camber torque stiffness can be expressed in a simplified manner by following formula (63).

[Numerical Formula 50]

$$\begin{aligned} C_{M\gamma} &= \left(-\frac{\partial t}{\partial \gamma}\cdot F_y - \frac{\partial F_y}{\partial \gamma}\cdot t + \frac{\partial M_{zr}}{\partial \gamma}\right)\frac{1}{F_z} \\ &= -t \cdot C_{y\gamma} + R_0 \cdot \left(q_{Dz8} + q_{Dz9} df_z\right) \end{aligned} \tag{63}$$

Next, the load dependence of the normalized camber torque stiffness is expressed by following formula (64).

[Numerical Formula 51]

$$\frac{\partial C_{M\gamma}}{\partial F_z} = -\frac{\partial t}{\partial F_z}\cdot C_{y\gamma} - \frac{\partial C_{y\gamma}}{\partial F_z}\cdot t + R_0 \cdot \frac{q_{Dz9}}{F'_{z0}} \equiv \varepsilon_{M\gamma} \tag{64}$$

With regard to the above-described camber torque stiffness, the symbol (*) is applied to the above-described variables at the prescribed load in order to clearly show that this is the acquired tire design information, and the normalized camber torque stiffness and load dependence thereof are expressed by following formula (65) and formula (66).

[Numerical Formula 52]

$$C^*_{M\gamma} = -q_{Dz1} \cdot R_0 \cdot C^*_{\gamma\gamma} + R_0 \cdot q_{Dz8} \tag{65}$$

$$\varepsilon^*_{M\gamma} = -(q_{Dz1} + q_{Dz2}) \cdot \frac{R_0}{F'_{z0}} \cdot C^*_{\gamma\gamma} - q_{Dz1} \cdot R_0 \cdot \varepsilon^*_{\gamma\gamma} + q_{Dz9} \cdot \frac{R_0}{F'_{z0}} \tag{66}$$

If above formula (65) and formula (66) are arranged into formulas with respect to the MF parameters, they can be expressed by following formula (67) and formula (68).

[Numerical Formula 53]

$$q_{Dz8} = \frac{C^*_{M\gamma}}{R_0} + q_{Dz1} \cdot C^*_{\gamma\gamma} = \frac{1}{R_0}\left(C^*_{M\gamma} - \frac{C^*_{Mz} \cdot C^*_{\gamma\gamma}}{C^*_{\gamma\alpha}}\right) \tag{67}$$

$$q_{Dz9} = \frac{\varepsilon^*_{M\gamma}}{R_0} F'_{z0} + (q_{Dz1} + q_{Dz2}) \cdot C^*_{\gamma\gamma} + q_{Dz1} \cdot \varepsilon^*_{\gamma\gamma} \cdot F'_{z0} = \frac{\varepsilon^*_{M\gamma}}{R_0} F'_{z0} - \frac{F'_{z0}}{R_0 \cdot C^*_{\gamma\alpha}} \cdot \left(\varepsilon^*_{Mz} - \frac{\varepsilon^*_{\gamma\alpha} C^*_{Mz}}{C^*_{\gamma\alpha}}\right) \cdot C^*_{\gamma\gamma} - \frac{C^*_{Mz} \cdot \varepsilon^*_{\gamma\gamma} \cdot F'_{z0}}{R_0 \cdot C^*_{\gamma\alpha}} \tag{68}$$

In this way, in relation to the MF model, there are relationships of correspondence between the camber stiffness $C_{M\gamma}$* of the tire and the load dependence $\varepsilon_{M\gamma}$* thereof, and the MF parameters $q_{Dz8}$, $q_{Dz9}$. Accordingly, it suffices to store, in the storing section 18, the relationships of correspondence between the tire design information that are the camber stiffness $C_{M\gamma}$* of the tire and the load dependence $\varepsilon_{M\gamma}$* thereof, and the MF parameters $q_{Dz8}$, $q_{Dz9}$, which relationships of correspondence are expressed by above formula (67) and formula (68).

Examples of information (a table of correspondence), which express the relationships of correspondence that are stored in the storing section 18, are illustrated in Table 10. In Table 10, the relational expressions shown by above formula (67) and formula (68) are made into a table of correspondence as information expressing the relationships of correspondence between the tire design information and the MF parameters.

(Braking Stiffness)

Next, braking stiffness is described as a fourth example of the tire design information. Here, normalized braking stiffness at a prescribed load that is determined in advance is used.

Here, the simulation accuracy of the tire model is improved by using MF parameters in accordance with $p_{Kx1}$, $p_{Kx2}$ instead of using the MF coefficients as eigenvalues of the tire. $p_{Kx1}$, $p_{Kx2}$ are parameters relating to the braking stiffness of the tire. Accordingly, in the MF model, by inputting these $p_{Kx1}$, $p_{Kx2}$ and MF parameters, the lateral force $F_{yp}$ generated at the tire can be derived with high accuracy.

By identifying the MF coefficients of above formula (1) by using the MF model expressed by formula (1).

Normalized braking stiffness $C_{x\kappa}$ is expressed by following formula (69), and the load dependence thereof is expressed by following formula (70).

[Numerical Formula 54]

$$C_{x\kappa} = \frac{K_{x\kappa}}{F_z} = (p_{Kx1} + p_{Kx2} df_x)\exp(p_{Kx3} df_x) \tag{69}$$

$$\frac{\partial C_{x\kappa}}{\partial F_z} = \frac{p_{Kx2}}{F'_{z0}} \exp(p_{Kx3} df_x) + \frac{p_{Kx3}}{F'_{z0}}(p_{Kx1} + p_{Kx2} df_x)\exp(p_{Kx3} df_x) \equiv \varepsilon_{x\kappa} \tag{70}$$

With regard to the above-described braking stiffness, the load nonlinearity not varying with respect the load is used as a condition, and the symbol (*) is applied to the above-described variables at the prescribed load in order to clearly show that this is the acquired tire design information, and the normalized braking stiffness $C_{x\kappa}$* and the load dependence $\varepsilon_{x\kappa}$* thereof are expressed by following formula (71) and formula (72).

[Numerical Formula 55]

$$C^*_{x\kappa} = p_{Kx1} \tag{71}$$

$$\varepsilon^*_{x\kappa} \equiv \frac{p_{Kx2}}{F'_{z0}} \tag{72}$$

If above formula (71) and formula (72) are arranged into formulas with respect to the MF parameters, they can be expressed by following (73) and formula (74).

TABLE 10

| Tire design information (camber torque stiffness) | Table of correspondence (relational expressions) | MF parameters |
|---|---|---|
| $C_{M\gamma}$*, $\varepsilon_{M\gamma}$* | $q_{Dz8} = \frac{C^*_{M\gamma}}{R_0} + q_{Dz1} \cdot C^*_{\gamma\gamma} = \frac{1}{R_0}\left(C^*_{M\gamma} - \frac{C^*_{Mz} \cdot C^*_{\gamma\gamma}}{C^*_{\gamma\alpha}}\right)$ | $q_{Dz8}$, $q_{Dz9}$ |
| | $q_{Dz9} = \frac{\varepsilon^*_{M\gamma}}{R_0} F'_{z0} + (q_{Dz1} + q_{Dz2}) \cdot C^*_{\gamma\gamma} + q_{Dz1} \cdot \varepsilon^*_{\gamma\gamma} \cdot F'_{z0} = \frac{\varepsilon^*_{M\gamma}}{R_0} F'_{z0} - \frac{F'_{z0}}{R_0 \cdot C^*_{\gamma\alpha}} \cdot \left(\varepsilon^*_{Mz} - \frac{\varepsilon^*_{\gamma\alpha} C^*_{Mz}}{C^*_{\gamma\alpha}}\right) \cdot C^*_{\gamma\gamma} - \frac{C^*_{Mz} \cdot \varepsilon^*_{\gamma\gamma} \cdot F'_{z0}}{R_0 \cdot C^*_{\gamma\alpha}}$ | |

[Numerical Formula 56]

$$p_{Kx1} = C^{*}_{xK} \quad (73)$$

$$p_{Kx2} = \varepsilon^{*}_{xK} F'_{z0} \quad (74)$$

In this way, in relation to the MF model, there are relationships of correspondence between the braking stiffness $C_{xK}$* of the tire and the load dependence $\varepsilon_{xK}$* thereof, and the MF parameters $p_{Kx1}$, $p_{Kx2}$. Accordingly, it suffices to store, in the storing section 18, the relationships of correspondence between the tire design information that is the braking stiffness $C_{xK}$* of the tire and the load dependence $\varepsilon_{xK}$* thereof, and the MF parameters $p_{Kx1}$, $p_{Kx2}$, which relationships of correspondence are expressed by above formula (73) and formula (74). Namely, it suffices to store the relationship of correspondence between the normalized braking stiffness $C_{xK}$* that serves as tire design information and the MF parameter $p_{Kx1}$ that relates to the normalized braking stiffness $C_{xK}$*, and the relationship of correspondence between the tire design information that is the load dependence $\varepsilon_{xK}$* of the braking stiffness that serves as the tire design information and the MF parameter $p_{Kx2}$ that relates to the load dependence $\varepsilon_{xK}$* of the normalized braking stiffness.

Examples of information (a table of correspondence), which express the relationships of correspondence that are stored in the storing section 18, are illustrated in Table 11. In Table 11, the relational expressions shown by above formula (73) and formula (74) are made into a table of correspondence as information expressing the relationships of correspondence between the tire design information and the MF parameters.

TABLE 11

| Tire design information (camber stiffness) | Table of correspondence (relational expressions) | MF parameters |
|---|---|---|
| $c_{xK}$*, $\varepsilon_{xK}$* | $p_{Kx1} = C_{xK}$*<br>$p_{Kx2} = \varepsilon_{xK}* \cdot F'_{z0}$ | $p_{Kx1}$, $p_{Kx2}$ |

(Relaxation Length)

The relaxation length, which differs in accordance with the type of the MF model, is described in detail as a fifth example of the tire design information relating to the present embodiment.

In the above-described embodiment, the relaxation length that is expressed as an independent formula can be applied to the first MF model. On the other hand, in the second MF model, the relaxation length is defined so as to be determined while taking the cornering stiffness into consideration. Thus, the relaxation length relating to the second MF model is described in detail hereinafter.

The relaxation length expressed by above formula (18) depends on the shape factor Cy (hereinafter called lateral stiffness Cy) that expresses the lateral stiffness. This lateral stiffness Cy is expressed by following formula (75), and the load dependence thereof is expressed by a quadratic equation in following formula (76). Note that $p_{cfy1}$, $p_{cfy2}$ are internal coefficients of the MF.

[Numerical Formula 57]

$$C_y = C_{y0}\left(1 + p_{cfy1} dz_f + p_{cfy2} df_z^2\right) \quad (75)$$

$$\frac{\partial C_y}{\partial F_z} = C_{y0}\left(\frac{p_{cy1}}{F'_{z0}} + \frac{2p_{cy2}(F_z - F'_{z0})}{F'^{2}_{z0}}\right) \quad (76)$$

Because two MF parameters ($p_{cfy1}$, $p_{cfy2}$) exist in formula (76) that expresses the above-described load dependence, appropriate conditional expressions are set for these MF parameters. Specifically, the slope of the lateral stiffness at the prescribed load, and the load (Fz) that has a maximum value at the time of approximating the lateral stiffness by a quadratic function, are set as conditions. The MF parameters ($p_{cy1}$, $p_{cy2}$) are described hereinafter.

By the way, the load dependence of the lateral stiffness can be modified into following formula (77) by using above formula (18).

[Numerical Formula 58]

$$\begin{aligned}\frac{\partial C_y}{\partial F_z} &= \frac{\partial}{\partial F_z}\left(\frac{K_{y\alpha}}{\sigma_y}\right) \\ &= \frac{\partial}{\partial F_z}\left(\frac{C_{y\alpha} F_z}{\sigma_y}\right) \\ &= \frac{\partial C_{y\alpha}}{\partial F_z}\frac{F_z}{\sigma_y} + \frac{C_{y\alpha}}{\sigma_y} - \frac{C_{y\alpha} F_z}{\sigma_y^2}\frac{\partial \sigma_y}{\partial F_z}\end{aligned} \quad (77)$$

As described above, the fact that the load is a prescribed load is taken into consideration, and the symbol (*) is applied to the above-described variables at the prescribed load in order to clearly show that tire design information is acquired, and the lateral stiffness and the load dependence thereof can be expressed by following formula (78) and formula (79).

[Numerical Formula 59]

$$C_y = \frac{C^{*}_{y\alpha} F'_{z0}}{\sigma^{*}_y} \equiv C^{*}_y \quad (78)$$

$$\frac{\partial C_y}{\partial F_z} = \frac{\varepsilon^{*}_{y\alpha} F'_{z0}}{\sigma^{*}_y} + \frac{C^{*}_{y\alpha}}{\sigma^{*}_y} - \frac{C^{*}_{y\alpha} F'_{z0}}{\sigma^{*2}_y}\varepsilon^{*}_{\sigma y} \equiv \varepsilon^{*}_{Cy} \quad (79)$$

If above formula (78) and formula (79) are arranged, following formula (80) and formula (81) are obtained.

[Numerical Formula 60]

$$C^{*}_y\left(\frac{p_{cy1}}{F'_{z0}}\right) = \varepsilon^{*}_{Cy} \quad (80)$$

$$C^{*}_y\left(\frac{p_{cy1}}{F'_{z0}} + \frac{2p_{cy2}(F^{*}_z - F'_{z0})}{F'^{2}_{z0}}\right) = 0 \quad (81)$$

If above formula (80) and formula (81) are arranged into formulas with respect to the MF parameters, they can be expressed by following (82) and formula (83). The MF parameters $p_{cy1}$ and $p_{cy2}$ that are expressed by the following formulas are MK parameters relating to the relaxation length of the tire.

[Numerical Formula 61]

$$p_{cy1} = \frac{\varepsilon_{Cy}^* F'_{z0}}{C_y^*} \quad (82)$$

$$p_{cy2} = -\frac{p_{cy1} F'_{z0}}{2(F_z^* - F'_{z0})} \quad (83)$$

Note that, if it is assumed that the lateral stiffness is linear with respect to the load, it suffices to derive ($p_{cy2}$=0) and the MF parameter ($p_{cy1}$) without taking load dependence into consideration.

Further, although the above describes the derivation of the MF parameters relating to the relaxation length in the lateral direction, the structures of the formulas are similar for the longitudinal direction as well and can be handled similarly, and therefore, detailed description thereof is omitted.

In this way, in relation to the MF model, there are relationships of correspondence between the lateral stiffness $C_y$* of the tire and the load dependence $\varepsilon_{Cy}$* thereof, and the MF parameters $p_{cy1}$, $p_{cy2}$ that relate to the relaxation length. Accordingly, it suffices to store, in the storing section 18, the relationships of correspondence between the lateral stiffness $C_y$* of the tire that relates to the tire design information and the load dependence $\varepsilon_{Cy}$* thereof, and the MF parameters $p_{cy1}$, $p_{cy2}$, which relationships of correspondence are expressed by above formula (82) and formula (83). Namely, it suffices to store the relationships of correspondence between the lateral stiffness $C_y$* of the tire that relates to the relaxation length that serves as the tire design information, and the MF parameters $p_{cy1}$, $p_{cy2}$ that relate to the load dependence $\varepsilon_{Cy}$* of the lateral stiffness of the tire.

Examples of information (a table of correspondence), which express the relationships of correspondence that are stored in the storing section 18, are illustrated in Table 12. In Table 12, the relational expressions shown by above formula (82) and formula (83) are made into a table of correspondence as information expressing the relationships of correspondence between the tire design information and the MF parameters.

TABLE 12

| Tire design information (relaxation length) | Table of correspondence (relational expressions) | MF parameters |
|---|---|---|
| $C_y$*, $\varepsilon_{Cy}$* | $p_{cy1} = \frac{\varepsilon_{Cy}^* F'_{z0}}{C_y^*}$ <br> $p_{cy2} = -\frac{p_{cy1} F'_{z0}}{2(F_z^* - F'_{z0})}$ | $p_{Cy1}$, $p_{Cy2}$ |

(Road Friction Coefficient)

The road friction coefficient is described as a sixth example of the tire design information relating to the present embodiment.

In the above-described embodiment, the road friction coefficient with respect to a prescribed load, such as a road index, is described. Here, the directionality is taken into consideration with respect to the road friction coefficient. Specifically, a road friction coefficient with respect to the lateral direction and a road friction coefficient with respect to the longitudinal direction are described.

The simulation accuracy of the tire model is improved by using MF parameters $p_{Dy1}$, $p_{Dy2}$ relating to the road friction coefficient in the lateral direction, and MF parameters $p_{Dx1}$, $p_{Dx2}$ relating to the road friction coefficient in the longitudinal direction.

First, the road friction coefficient is described in relation to the lateral direction. Note that, in the same way as in the above-described embodiment, in the present embodiment as well, description is given with the conditions being a case in which the camber angle $\gamma$ is zero ($\gamma$=0) and a prescribed internal pressure is exhibited (pressure increment dpi=0).

The road friction coefficient in the lateral direction is expressed by above formula (13), and the load change amount dfz is expressed by formula (14). In a case in which the load is a prescribed load, the load change amount dfz is zero, and the difference between the load and the prescribed load is zero, the MF parameter $p_{Dy1}$ is expressed by above formula (16).

In the same way as in the above-described example, the fact that the load is a prescribed load is taken into consideration, and, when the symbol (*) is applied to the above-described variables at the prescribed load in order to clearly show that the tire design information is acquired, the relationships between the road friction coefficient in the lateral direction and the load dependence thereof with the MF parameters can be expressed by following formula (84) and formula (85).

[Numerical Formula 62]

$$p_{Dy1} = \mu_y^* \quad (84)$$

$$\frac{\partial \mu_y}{\partial F_z} \equiv \varepsilon_{\mu y} = \frac{p_{Dy2}}{F'_{z0}} \quad (85)$$

If above formula (85) is arranged into a formula with respect to the MF parameter, it is expressed by following formula (86).

[Numerical Formula 63]

$$p_{Dy2} = \varepsilon_{\mu y}^* F'_{z0} \quad (86)$$

Accordingly, it suffices to store, in the storing section 18, the relationships of correspondence between the tire design information that is the road friction coefficient $\mu_y$ in the lateral direction, and the MF parameters $p_{Dy1}$, $p_{Dy2}$. Namely, it suffices to store the relationship of correspondence between the road friction coefficient $\mu_y$ that serves as the tire design information and the MF parameter $p_{Dy1}$ that relates to the road friction coefficient $\mu_y$, and the relationship of correspondence between the tire design information that is the load dependence $\varepsilon_{\mu y}$* of the road friction coefficient $\mu_y$ that serves as the tire design information and the MF parameter $p_{Dy2}$ that relates to the load dependence of the road friction coefficient $\mu_y$.

Examples of information (a table of correspondence), which express the relationships of correspondence that are stored in the storing section 18, are illustrated in following Table 13. In Table 13, the relational expressions shown by above formula (84) and formula (86) are made into a table of correspondence as information expressing the relationships of correspondence between the tire design information and the MF parameters.

TABLE 13

| Tire design information (camber stiffness) | Table of correspondence (relational expressions) | MF parameters |
|---|---|---|
| $\mu_y^*$, $\varepsilon_{\mu y}^*$ | $p_{Dy1} = \mu_y^*$<br>$p_{Dy2} = \varepsilon_{\mu y}^* \cdot F'_{z0}$ | $p_{Dy1}$, $p_{Dy2}$ |

Next, the road friction coefficient in the longitudinal direction is described. Here as well, description is given with the conditions being a case in which the camber angle $\gamma$ is zero ($\gamma$=0) and prescribed internal pressure is exhibited (pressure increment dpi=0).

In the same way as described above, the relationship of the road friction coefficient in the longitudinal direction and the load dependence thereof with the MF parameters can be expressed by following formula (87) and formula (88). If formula (88) is arranged with respect to the MF parameter, it is expressed by formula (89).

[Numerical Formula 64]

$$p_{Dx1} = \mu_x^* \tag{87}$$

$$\frac{\partial \mu_x}{\partial F_z} \equiv \varepsilon_{\mu x} = \frac{p_{Dx2}}{F'_{z0}} \tag{88}$$

$$p_{Dx2} = \varepsilon_{\mu x}^* F'_{z0} \tag{89}$$

Accordingly, it suffices to store, in the storing section 18, the relationships of correspondence between the tire design information that is the road friction coefficient $\mu_x$ in the longitudinal direction, and the MF parameters $p_{Dx1}$, $p_{Dx2}$, which relationships of correspondence are expressed by above formula (87) and formula (89). Namely, it suffices to store the relationship of correspondence between the road friction coefficient $\mu_x$ that serves as the tire design information and the MF parameter $p_{Dx1}$ that relates to the road friction coefficient $\mu_x$, and the relationship of correspondence between the tire design information that is the load dependence $\varepsilon\mu_x^*$ of the road friction coefficient $\mu_x$ that serves as the tire design information and the MF parameter $p_{Dx2}$ that relates to the load dependence of the road friction coefficient ux.

Examples of information (a table of correspondence), which express the relationships of correspondence that are stored in the storing section 18, are illustrated in following Table 14. In Table 14, the relational expressions shown by above formula (87) and formula (89) are made into a table of correspondence as information expressing the relationships of correspondence between the tire design information and the MF parameters.

TABLE 14

| Tire design information (road friction coefficient) | Table of correspondence (relational expressions) | MF parameters |
|---|---|---|
| $\mu x^*$, $\varepsilon_{\mu x}^*$ | $p_{Dx1} = \mu_x^*$<br>$p_{Dx2} = \varepsilon_{\mu x}^* \cdot F'_{z0}$ | $p_{Dx1}$, $p_{Dx2}$ |

As described above, in accordance with the analyzing device of the present embodiment, tire behavior can be analyzed easily by an MF model, by using tire design information and without using data obtained by actually measuring tires. Further, by using a tire model that is in accordance with the MF model, vehicle simulation can be carried out easily while reflecting tire design information.

Figure 8:
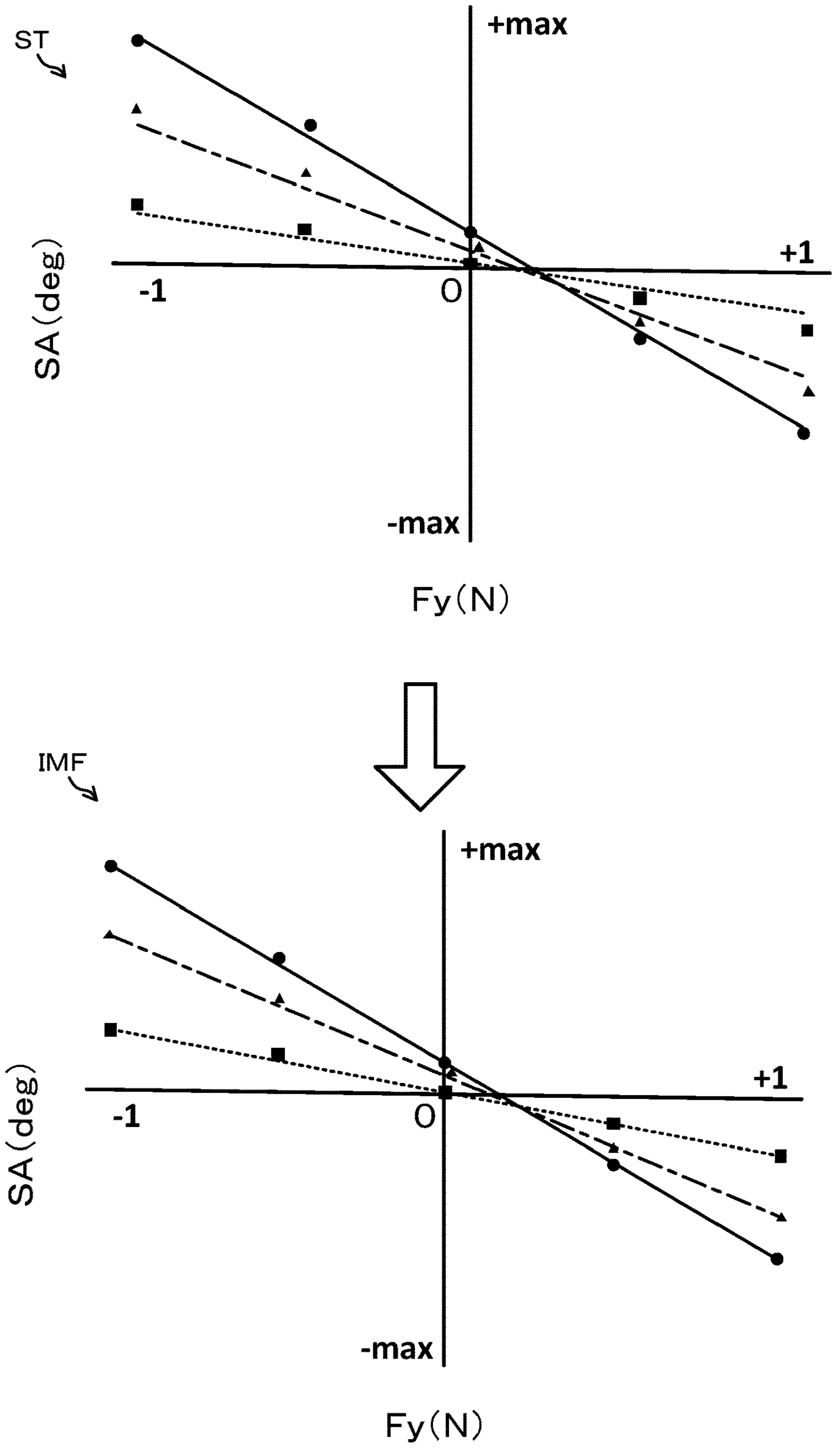
FIG. 8 is a drawing illustrating an example of the relationship between inputs and outputs at the tire information converting section of the analyzing device relating to the third embodiment.

FIG. 8 is a drawing illustrating an example of the relationship between the inputs and outputs at the tire information converting section of the analyzing device relating to the present embodiment. FIG. 8 illustrates results of verification relating to behavior analysis of a vehicle at the analyzing device relating to the above-described embodiment. FIG. 8 illustrates characteristic verification results with respect to load in a case in which the slip angle (SA) is on the horizontal axis and lateral force (Fy) is on the vertical axis. In FIG. 8, a drawing of the characteristics relating to the verification results obtained by using the analyzing device relating to the above-described embodiment are shown as IMF, and a drawing of characteristics relating to the verification results obtained by using a general analyzing device are shown as ST as a comparative example. The drawing IMF of the characteristics in FIG. 8 illustrates the characteristics relating to the output of an MF model in a case in which MF parameters, which relate to the above-described tire design information, are input as constraint conditions to the MF model. In the drawing, test results that are obtained by using data obtained by actually measuring tires are shown by the dots, and the characteristics of the outputs of the MF model are illustrated by line segments. The data obtained by actually measuring tires at a first load (e.g., 8 kN) are shown by the circular dots, and the characteristic of the output of the MF model is shown by the solid line. Further, the data obtained by actually measuring tires at a second load (e.g., 5 kN) are shown by the triangular dots, and the characteristic of the output of the MF model is shown by the one-dot chain line. Moreover, the data obtained by actually measuring tires at a third load (e.g., 2 kN) are shown by the square dots, and the characteristic of the output of the MF model is shown by the dashed line.

As illustrated in FIG. 8, the analyzing device relating to the above-described embodiment results in characteristics that well match test results that are in accordance with actually measured data, as compared with a usual analyzing device that is the comparative example. Namely, as shown in drawing IMF of the characteristics in accordance with the analyzing device relating to the above-described embodiment, test results in which actual tires were measured have distributions that are extremely close to the relationships derived at the analyzing device relating to the above-described embodiment. Accordingly, by converting good tire design information into MF parameters at the tire information converting section relating to the above-described embodiment, an MF model that reflects the tire design information can be used.

As described above, in accordance with the analyzing device of the above-described embodiment, tire behavior can be analyzed easily by an MF model, by using tire design information and without using data obtained by actually measuring tires. Further, by using a tire model that is in accordance with the MF model, vehicle simulation can be carried out easily while reflecting tire design information.

Accordingly, in accordance with the above-described disclosure, behavior analysis of tires can be carried out easily by using tire design information that includes information expressing transient characteristics of tires, without using data obtained by actually measuring tires.

Other Embodiments

The above describes an example of analyzing a vehicle model by a tire model that is in accordance with MF parameters that are derived due to tire design information being input. In the vehicle simulation, there are cases in which the traveling state of the vehicle is analyzed by changing some of the characteristics and structures of the parts of the vehicle. In this case, by using the above-described analyzing device 1, a physical amount such as a generated force or moment (e.g., lateral force) or the like of the tire in the vehicle simulation is used as the input, and by inversely converting this physical amount by using the above-described tire model, tire design information can be derived. Namely, as described above, tire design information can be reflected in a tire model by which the behavior of a tire can be analyzed, and the tire design information can also be taken into consideration in a vehicle simulation that uses the tire model.

Modified Examples

The above embodiment describes a case in which the analyzing device 1 has the tire information converting section 10, the tire model identifying section 20 and the vehicle simulation section 30, and vehicle simulation is carried out while reflecting tire design information. The technique of the present disclosure is not limited to having the tire information converting section 10, the tire model identifying section 20 and the vehicle simulation section 30. For example, the tire information converting section 10, the tire model identifying section 20 and the vehicle simulation section 30 may respectively be formed by independent devices, and the analyzing processing may be carried out by communication among the devices. In particular, by forming the tire information converting section 10 independently, e.g., forming it as a tire information converting device, the tire design information can be used in various devices that use an MF model.

Note that, although the above embodiment describes an example of application to a display device, such as a display or the like, as the display portion 40J, the display portion 40J may be a voice outputting device, or a display device and a voice outputting device may be combined.

The above embodiment describes a case in which an MF model is used as the tire model. However, the present disclosure can be applied to another model in which a generated force of the tire is expressed by parameters relating to the tire, as the parameters that identify the tire model.

As described above, the present disclosure can analyze behavior of a tire by using tire design information and without using data obtained by actually measuring tires. Further, the technique of the disclosure includes various processings being realized by software structures and hardware structures that use computers, and therefore includes the following techniques.

A first aspect of the present disclosure is a tire behavior estimating device that estimates a physical amount relating to behavior of a tire from tire design information by using a tire model that outputs a physical amount relating to behavior of a tire in accordance with input parameters, the device comprising:

a storing section storing relationships of correspondence between tire design information and parameters that are inputs to the tire model;

an acquiring section acquiring tire design information;

a converting section that, based on the relationships of correspondence stored in the storing section, converts tire design information acquired at the acquiring section into parameters to be input into the tire model; and an inputting section inputting the parameters converted at the converting section into the tire model.

In accordance with the first aspect, behavior analysis of the tire is possible by using tire design information and without using data obtained by actual measurement of tires.

In a second aspect of the present disclosure, in the tire behavior estimating device of the first aspect, the tire model is a Magic Formula model.

In accordance with the second aspect, tire design information can be applied to the Magic Formula model that models generated forces of tires.

In a third aspect of the present disclosure, in the tire behavior estimating device of the second aspect, the physical amount relating to behavior of the tire includes a generated force of the tire including lateral force of the tire, and the tire design information includes information expressing cornering stiffness.

In accordance with the third aspect, cornering stiffness can be applied to a Magic Formula model.

In a fourth aspect of the present disclosure, in the tire behavior estimating device of the third aspect, given that, as the tire design information, Wa is normalized cornering stiffness and Wb is load dependence of the normalized cornering stiffness, and, as the parameters, physical amounts relating to cornering stiffness of the tire are $p_{Ky1}$ and $p_{Ky2}$, the parameters are derived from the tire design information by using formulas expressed by

[Numerical Formula 65]

$$p_{Ky2} = \sqrt{-\frac{2Wa}{WbF'_{z0}} - 1}$$

$$p_{Ky1} = \frac{Wa}{\sin\left[2\arctan\left\{\frac{1}{p_{Ky2}}\right\}\right]}.$$

In accordance with the fourth aspect, the parameters can be derived easily, as compared with deriving approximation curves from actually measured values of tires and specifying the parameters.

In a fifth aspect of the present disclosure, in the tire behavior estimating device of the fourth aspect, given that, as the tire design information, a road friction coefficient at prescribed load $F'_{z0}$, which is load $F_z$ with respect to the tire having been determined in advance, is $\mu_y$, and, as the parameters, a parameter relating to the road friction coefficient is $p_{Dy1}$ and a parameter, which relates to the road friction coefficient at a load that is n times the prescribed load where n is a real number, is $p_{Dy2}$, the parameters are derived from the tire design information by using formulas expressed by

[Numerical Formula 66]

$$p_{Dy1} = \mu_y|_{F_z=F'_{z0}}$$

$$p_{Dy2} = \frac{\mu_y - p_{Dy1}}{n-1}.$$

In accordance with the fifth aspect, the parameters can be derived easily, as compared with deriving approximation curves from actually measured values of tires and specifying the parameters.

In a sixth aspect of the present disclosure, in the above-described tire behavior estimating devices, the tire design information is tire design information that includes information expressing transient characteristics of a tire, and based on the relationships of correspondence stored in the storing section, the converting section converts tire design information, which is acquired by the acquiring section and includes information expressing transient characteristics of the tire, into parameters to be input into the tire model.

Further, the sixth aspect is a tire behavior estimating device that estimates a physical amount relating to behavior of a tire from tire design information by using a tire model that outputs a physical amount relating to behavior of a tire in accordance with input parameters, and the device can comprise:

a storing section storing relationships of correspondence between tire design information, which includes information expressing transient characteristics of a tire, and parameters that are inputs to the tire model;

an acquiring section acquiring tire design information that includes information expressing transient characteristics of a tire;

a converting section that, based on the relationships of correspondence stored in the storing section, converts the tire design information acquired at the acquiring section into parameters to be input into the tire model; and an inputting section inputting the parameters converted at the converting section into the tire model.

In accordance with the sixth aspect, behavior analysis of the tire is possible by using tire design information, which includes information expressing transient characteristics of a tire, and without using data obtained by actual measurement of tires.

In a seventh aspect of the present disclosure, in the tire behavior estimating device of the sixth aspect, the physical amount relating to behavior of the tire includes a generated force of the tire including lateral force of the tire, and the tire design information, which includes the information expressing transient characteristics of the tire, includes information expressing relaxation length of the tire.

In accordance with the seventh aspect, the relaxation length of the tire can be applied to a Magic Formula model.

In an eighth aspect of the present disclosure, in the tire behavior estimating device of the seventh aspect, given that, as the tire design information, $q_1$ is the relaxation length of the tire, $q_2$ is load dependence of the relaxation length, $R_0$ is a radius of the tire and $F_{z0}'$ is a prescribed load determined in advance with respect to the tire, and, as the parameters, physical amounts relating to the relaxation length of the tire are $p_{Ty1}$ and $p_{Ty2}$, the parameters are derived from the tire design information, which includes the information expressing transient characteristics of the tire, by using formulas expressed by

[Numerical Formula 67]

$$p_{Ty1} = \frac{q_1}{R_0 \sin\left[2\arctan\left(\frac{1}{p_{Ty2}}\right)\right]}$$

$$p_{Ty2} = \sqrt{\frac{q_1 + q_2 F_{z0}'}{q_1 - q_2 F_{z0}'}}.$$

In accordance with the eighth aspect, the parameters can be derived easily, as compared with deriving approximation curves from actually measured values of tires and specifying the parameters.

In a ninth aspect of the present disclosure, in the tire behavior estimating device of the second aspect, the parameters include a parameter relating to a physical amount included in the tire design information, and a parameter relating to load dependence of the physical amount included in the tire design information.

In accordance with the ninth aspect, the parameters can be derived highly accurately as compared with a case in which the load dependence is not taken into consideration.

In a tenth aspect of the present disclosure, in the tire behavior estimating device of the second aspect, the physical amount relating to behavior of the tire includes a generated force of the tire including lateral force of the tire, and the tire design information includes at least one of information expressing self-aligning torque stiffness, information expressing camber stiffness, information expressing camber torque stiffness, and information expressing braking stiffness.

In accordance with the tenth aspect, it is possible to use, in a Magic Formula model, at least one of information expressing self-aligning torque stiffness, information expressing camber stiffness, information expressing camber torque stiffness, and information expressing braking stiffness.

In an eleventh aspect of the present disclosure, in the tire behavior estimating device of the tenth aspect, given that, as the tire design information, $C_{Mz}^*$ is self-aligning torque stiffness and $\varepsilon_{Mz}^*$ is load dependence of the self-aligning torque stiffness, and, as the parameters, physical amounts relating to the self-aligning torque stiffness of the tire are $q_{Dz1}$ and $q_{Dz2}$, the parameters are derived from the tire design information by using formulas expressed by

[Numerical Formula 68]

$$q_{Dz1} = -\frac{C_{Mz}^*}{R_0 \cdot C_{y\alpha}^*}$$

$$q_{Dz2} = \frac{1}{R_0 \cdot C_{y\alpha}^*}\left[C_{Mz}^* - F_{z0}' \cdot \left(\varepsilon_{Mz}^* - \frac{\varepsilon_{y\alpha}^* C_{Mz}^*}{C_{y\alpha}^*}\right)\right].$$

In a twelfth aspect of the present disclosure, in the tire behavior estimating device of the tenth aspect, given that, as the tire design information, $C_{y\gamma}^*$ is camber stiffness and $\varepsilon_{y\gamma}^*$ is load dependence of the camber stiffness, and, as the parameters, physical amounts relating to the camber stiffness of the tire are $p_{Vy3}$ and $p_{Vy4}$, or are $p_{Ky6}$ and $p_{Ky7}$, the parameters are derived from the tire design information by using formulas expressed by

[Numerical Formula 69]

$$p_{Vy3} = C_{y\gamma}^*$$

$$p_{Vy4} = \varepsilon_{y\gamma}^* \cdot F_{z0}'$$

$$p_{Ky6} = C_{y\gamma}^*$$

$$p_{Ky7} = \varepsilon_{y\gamma}^* \cdot F_{z0}'.$$

In a thirteenth aspect of the present disclosure, in the tire behavior estimating device of the tenth aspect, given that, as the tire design information, $C_{M\gamma}^*$ is camber torque stiffness and $\varepsilon_{M\gamma}^*$ is load dependence of the camber torque stiffness, and, as the parameters, physical amounts relating to the camber torque stiffness of the tire are $q_{Dz8}$ and $q_{Dz9}$, the parameters are derived from the tire design information by using formulas expressed by

[Numerical Formula 70]

$$q_{Dz8} = \frac{C_{M\gamma}^*}{R_0} + q_{Dz1} \cdot C_{y\gamma}^* = \frac{1}{R_0}\left(c_{M\gamma}^* - \frac{C_{Mz}^* \cdot C_{y\gamma}^*}{C_{y\alpha}^*}\right)$$

$$q_{Dz9} = \frac{\varepsilon_{M\gamma}^*}{R_0} F'_{z0} + (q_{Dz1} + q_{Dz2}) \cdot C_{y\gamma}^* + q_{Dz1} \cdot \varepsilon_{y\gamma}^* \cdot F'_{z0} = \frac{\varepsilon_{M\gamma}^*}{R_0} F'_{z0} - \frac{F'_{z0}}{R_0 \cdot C_{y\alpha}^*} \cdot \left(\varepsilon_{Mz}^* - \frac{\varepsilon_{y\alpha}^* C_{Mz}^*}{C_{y\alpha}^*}\right) \cdot C_{y\gamma}^* - \frac{C_{Mz}^* \cdot \varepsilon_{y\gamma}^* \cdot F'_{z0}}{R_0 \cdot C_{y\alpha}^*}.$$

In a fourteenth aspect of the present disclosure, in the tire behavior estimating device of the tenth aspect, given that, as the tire design information, $C_{xk}^*$ is braking stiffness and $\varepsilon_{xk}^*$ is load dependence of the braking stiffness, and, as the parameters, physical amounts relating to the braking stiffness of the tire are $p_{Kx1}$ and $p_{Kx2}$, the parameters are derived from the tire design information by using formulas expressed by

[Numerical Formula 71]

$$p_{Kx1} = C_{x\kappa}^*$$

$$p_{Kx2} = \varepsilon_{x\kappa}^* F'_{z0}.$$

In accordance with the eleventh aspect through the fourteenth aspect, the parameters can be derived easily, as compared with deriving approximation curves from actually measured values of tires and specifying the parameters.

Although the technique of the present disclosure has been described above by using embodiments, the technical scope of the technique of the present disclosure is not limited to the scopes described in the above embodiments. Various changes and improvements can be made to the above-described embodiments within a scope that does not depart from the gist, and forms to which such changes and improvements have been made also are included in the technical scope of the technique of the disclosure.

Further, the above embodiments describe processings that are carried out due to execution of a program that is stored in the storing section, but at least some of the processings of the program may be realized by hardware. Further, the flow of the processings of the above-described program is an example, and unnecessary steps may be deleted therefrom, new steps may be added thereto, or the order of processings may be changed, within a scope that does not depart from the gist.

Moreover, the processings of the above-described embodiments may be stored as a program on a storage medium or the like such as an optical disc or the like, and distributed.

The above embodiments describe a case in which processings are executed by using a CPU that serves as an example of a generic processor. The processor means a processor in the broad sense, and is not limited to a generic processor, and includes dedicated-use processors (e.g., GPUs: Graphics Processing Units, ASICs: Application Specific Integrated Circuits, FPGAs: Field-Programmable Gate Arrays), programmable logic devices, and the like). Further, the operations of the processor may be carried out by plural processors, which exist at physically separate locations, cooperating with one another, and not only by a single processor.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A tire behavior estimating device that estimates a physical amount relating to behavior of a tire from tire design information by using a tire model that outputs a physical amount relating to behavior of a tire in accordance with input parameters, the device comprising:

a storing section storing relationships of correspondence between tire design information and parameters that are inputs to the tire model;

an acquiring section acquiring tire design information;

a converting section that, based on the relationships of correspondence stored in the storing section, converts tire design information acquired at the acquiring section into parameters to be input into the tire model; and an inputting section inputting the parameters converted at the converting section into the tire model, wherein:

the tire model is a Magic Formula model, the physical amount relating to behavior of the tire includes a generated force of the tire including lateral force of the tire, the tire design information includes information expressing cornering stiffness, and given that, as the tire design information, Wa is normalized cornering stiffness and Wb is load dependence of the normalized cornering stiffness, and, as the parameters, physical amounts relating to cornering stiffness of the tire are $p_{Ky1}$ and $p_{Ky2}$, the parameters are derived from the tire design information by using formulas expressed by Numerical Formula 1

$$p_{Ky2} = \sqrt{-\frac{2Wa}{WbF'_{z0}} - 1}$$

$$p_{Ky1} = \frac{Wa}{\sin\left[2\arctan\left\{\frac{1}{p_{Ky2}}\right\}\right]}.$$

2. The tire behavior estimating device of claim 1, wherein:

given that, as the tire design information, a road friction coefficient at prescribed load $F'_{z0}$, which is load $F_z$ with respect to the tire having been determined in advance, is $\mu_y$, and, as the parameters, a parameter relating to the road friction coefficient is $p_{Dy1}$ and a parameter, which relates to the road friction coefficient at a load that is n times the prescribed load where n is a real number, is $p_{Dy2}$, the parameters are derived from the tire design information by using formulas expressed by Numerical Formula 2

$$p_{Dy1} = \mu_y|_{F_z=F'_{z0}}$$

$$p_{Dy2} = \frac{\mu_y - p_{Dy1}}{n-1}.$$

3. A tire behavior estimating device that estimates a physical amount relating to behavior of a tire from tire design information by using a tire model that outputs a physical amount relating to behavior of a tire in accordance with input parameters, the device comprising:

a storing section storing relationships of correspondence between tire design information and parameters that are inputs to the tire model;

an acquiring section acquiring tire design information;

a converting section that, based on the relationships of correspondence stored in the storing section, converts tire design information acquired at the acquiring section into parameters to be input into the tire model; and an inputting section inputting the parameters converted at the converting section into the tire model, wherein:

the tire design information is tire design information that includes information expressing transient characteristics of a tire, based on the relationships of correspondence stored in the storing section, the converting section converts tire design information, which is acquired by the acquiring section and includes information expressing transient characteristics of the tire, into parameters to be input into the tire model, the physical amount relating to behavior of the tire includes a generated force of the tire including lateral force of the tire, the tire design information, which includes the information expressing transient characteristics of the tire, includes information expressing relaxation length of the tire, and given that, as the tire design information, $q_1$ is the relaxation length of the tire, $q_2$ is load dependence of the relaxation length, $R_0$ is a radius of the tire and $F_{z0}'$ is a prescribed load determined in advance with respect to the tire, and, as the parameters, physical amounts relating to the relaxation length of the tire are $p_{Ty1}$ and $p_{Ty2}$, the parameters are derived from the tire design information, which includes the information expressing transient characteristics of the tire, by using formulas expressed by Numerical Formula 3

$$p_{Ty1} = \frac{q_1}{R_0 \sin\left[2\arctan\left(\frac{1}{p_{Ty2}}\right)\right]}$$

$$p_{Ty2} = \sqrt{\frac{q_1 + q_2 F'_{z0}}{q_1 - q_2 F'_{z0}}}.$$

* * * * *